US012764279B2

(12) United States Patent
Dumas et al.

(10) Patent No.: US 12,764,279 B2
(45) Date of Patent: Oct. 13, 2026

(54) TEMPLATE-BASED INTRA MODE DERIVATION WITH WIDE ANGLE INTRA PREDICTION

(71) Applicant: InterDigital CE Patent Holdings, SAS, Paris (FR)

(72) Inventors: Thierry Dumas, Rennes (FR); Kevin Reuzé, Rennes (FR); Franck Galpin, Thorigne-Fouillard (FR); Karam Naser, Mouazé (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/855,159

(22) PCT Filed: Apr. 6, 2023

(86) PCT No.: PCT/EP2023/059283
§ 371 (c)(1),
(2) Date: Oct. 8, 2024

(87) PCT Pub. No.: WO2023/194588
PCT Pub. Date: Oct. 12, 2023

(65) Prior Publication Data

US 2025/0254291 A1 Aug. 7, 2025

(30) Foreign Application Priority Data

Apr. 8, 2022 (EP) .................................... 22305511

(51) Int. Cl.
*H04N 19/11* (2014.01)
*H04N 19/167* (2014.01)
*H04N 19/176* (2014.01)

(52) U.S. Cl.
CPC .......... *H04N 19/11* (2014.11); *H04N 19/167* (2014.11); *H04N 19/176* (2014.11)

(58) Field of Classification Search
CPC .... H04N 19/147; H04N 19/176; H04N 19/11; H04N 19/167; H04N 19/593
See application file for complete search history.

(56) References Cited

U.S. PATENT DOCUMENTS 11,290,736 B1 3/2022 Wang et al.
12,301,868 B2 * 5/2025 Choi ..................... H04N 19/70
(Continued)

FOREIGN PATENT DOCUMENTS

WO 2020/055291 A1 3/2020

OTHER PUBLICATIONS

Wang Yang et al: "Probability-based decoder-side intra mode derivation for VVC", 2021 International Conference on Visual Communications and Image Processing (VCIP), IEEE, Dec. 5, 2021 (Dec. 5, 2021), pp. 1-5, XP034069355, DOI: 10.1109/VCIP53242.2021.9675443].*

(Continued)

*Primary Examiner* — Tsion B Owens
(74) *Attorney, Agent, or Firm* — Condo Roccia Koptiw LLP

(57) ABSTRACT

Systems, methods, and instrumentalities are disclosed for performing video coding to derive intra prediction modes for predicting a current block using TIMD with wide-angle intra prediction (WAIP). A most probable mode (MPM) list associated with a current block may be obtained. A test list of intra prediction modes may be determined from the MPM list. A first intra prediction mode may be tested, and the first intra prediction mode may be excluded from the test list or disallowed to be tested due to WAIP substitution. A prediction for the current block may be generated based on the tested intra prediction mode. The current block may be decoded using the prediction.

20 Claims, 28 Drawing Sheets

(56) References Cited

U.S. PATENT DOCUMENTS

| | | | | |
|---|---|---|---|---|
| 2014/0003662 | A1 | 1/2014 | Wang et al. | |
| 2024/0114131 | A1* | 4/2024 | Park | H04N 19/105 |
| 2024/0388702 | A1* | 11/2024 | Heo | H04N 19/196 |

OTHER PUBLICATIONS

Browne et al., "Algorithm description for Versatile Video Coding and Test Model 16 (VTM16)", Editors, JVET-Y2002-v1, Joint Video Experts Team (JVET) of ITU-T SG 16 WP 3 and ISO/IEC JTC 1/SC 29, 25th Meeting, by teleconference, Jan. 12-21, 2022, 126 pages.

Cao et al., "EE2-Related: Fusion for Template-Based Intra Mode Derivation", Qualcomm Incorporated, Bytedance Inc., JVET-W0123-v1, Joint Video Experts Team (JVET) of ITU-T SG 16 WP 3 and ISO/IEC JTC 1/SC 29, 23rd Meeting, by teleconference, Jul. 7-16, 2021, 4 pages.

Racape et al., "CE3-related: Wide-angle intra prediction for non-square blocks", Technicolor, Tencent, Huawei Technologies Co., Ltd, JVET-K0500_r2, Joint Video Experts Team (JVET) of ITU-T SG 16 WP 3 and ISO/IEC JTC 1/SC 29/WG 11, 11th Meeting, Ljubljana, SI, Jul. 10-18, 2018, 7 pages.

Seregin et al., "EE2: Summary Report on Enhanced Compression beyond VVC capability", EE Coordinators, JVET-W0024-v2, Joint Video Experts Team (JVET) of ITU-T SG 16 WP 3 and ISO/IEC JTC 1/SC 29, 23rd Meeting, by Teleconference, Jul. 7-16, 2021, 12 pages.

Wang et al., "Probability-based decoder-side intra mode derivation for VVC", 2021 International Conference on Visual Communications and Image Processing (VCIP), IEEE, Dec. 5, 2021, 5 pages.

* cited by examiner

TEMPLATE-BASED INTRA MODE DERIVATION WITH WIDE ANGLE INTRA PREDICTION

CROSS REFERENCE TO RELATED APPLICATIONS

This application is the National Stage Entry under 35 U.S.C. § 371 of Patent Cooperation Treaty Application No. PCT/EP2023/059283, filed Apr. 6, 2023, which claims the benefit of European Provisional Patent Application No. 22305511.2, filed Apr. 8, 2022, the contents of which are hereby incorporated by reference herein.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed for performing video coding to derive intra prediction modes for predicting a current block using template-based intra mode derivation (TIMD) with wide angle intra prediction (WAIP). A most probable mode (MPM) list associated with a current block may be obtained. A test list of intra prediction modes may be determined from the MPM list. A first intra prediction mode may be tested, and the first intra prediction mode may be excluded from the test list or disallowed to be tested due to wide-angle intra prediction (WAIP) substitution. A prediction for the current block may be generated based on the tested intra prediction mode. The current block may be processed (e.g., encoded and/or decoded) using the prediction.

A second intra prediction mode may be tested, and the second intra prediction mode may be included in the test list. The prediction for the current block may be generated based on the tested first intra prediction mode and the tested second intra prediction mode test. The testing of the first intra prediction mode may occur before the determination of the test list. The current block may be associated with a first shape, and the first intra prediction mode may be associated with a second shape.

The first shape may be rectangular, and the second shape may be square. Adjacent sides of the first shape may differ in length from one another. The first shape may be square, and the second shape may be rectangular. Adjacent sides of the second shape may differ in length from one another.

Multiple indices of intra prediction modes may be generated, and the multiple indices of intra prediction modes may be used to generate the prediction for the current block.

Weights of the multiple indices of intra prediction modes may be computed, and at least one of the weights may be a sum of absolute transform differences (SATDs). The prediction for the current block may be generated based on a subset of indices of intra prediction modes with a smallest prediction SATD from the multiple indices of intra prediction modes.

The generated prediction may be further based on computed weights. The computed weights may include a first computed weight associated with the tested first intra prediction mode and a second weight associated with the tested second intra prediction mode. At least one decoded reference sample may be added for the first intra prediction mode.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
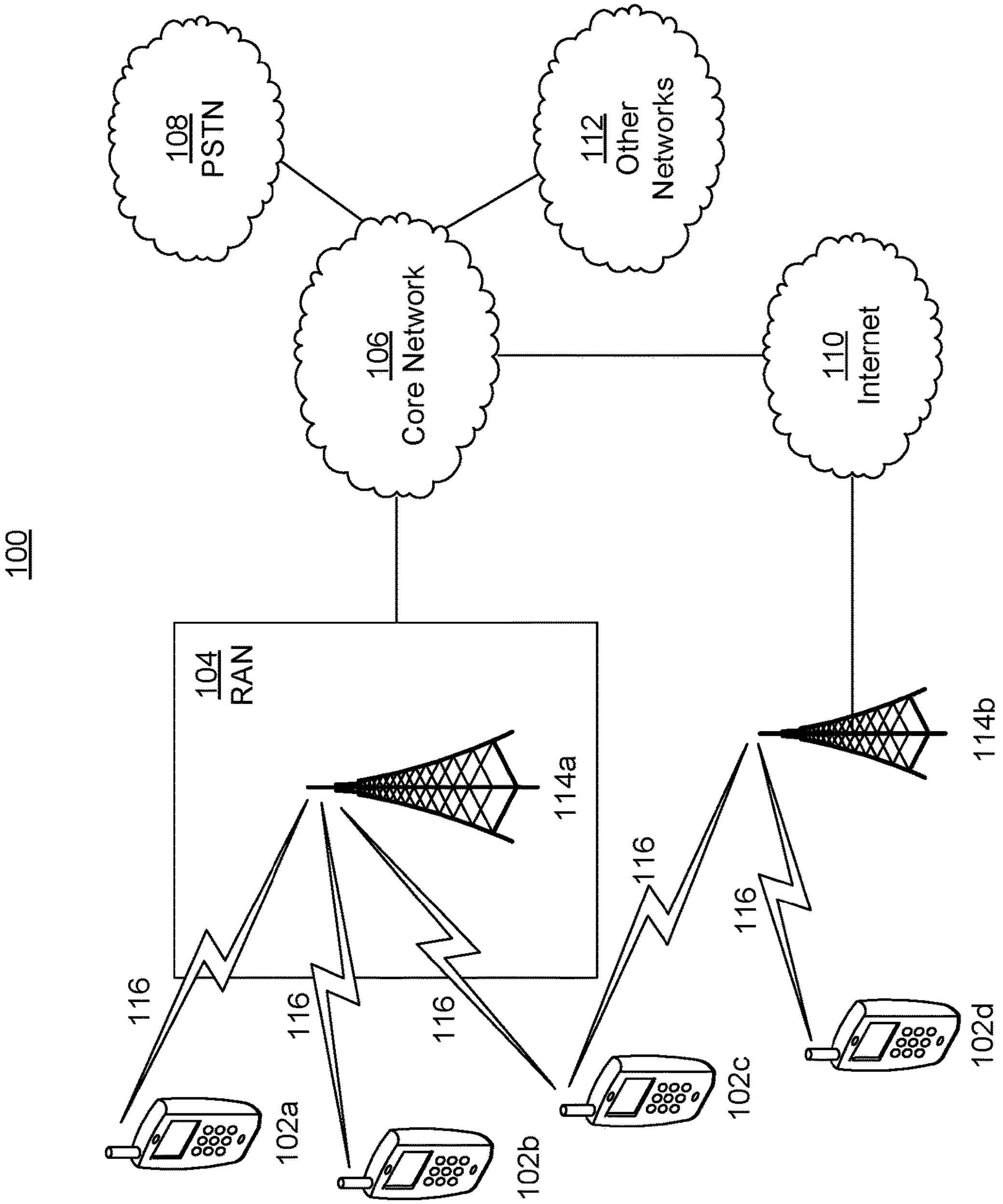
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
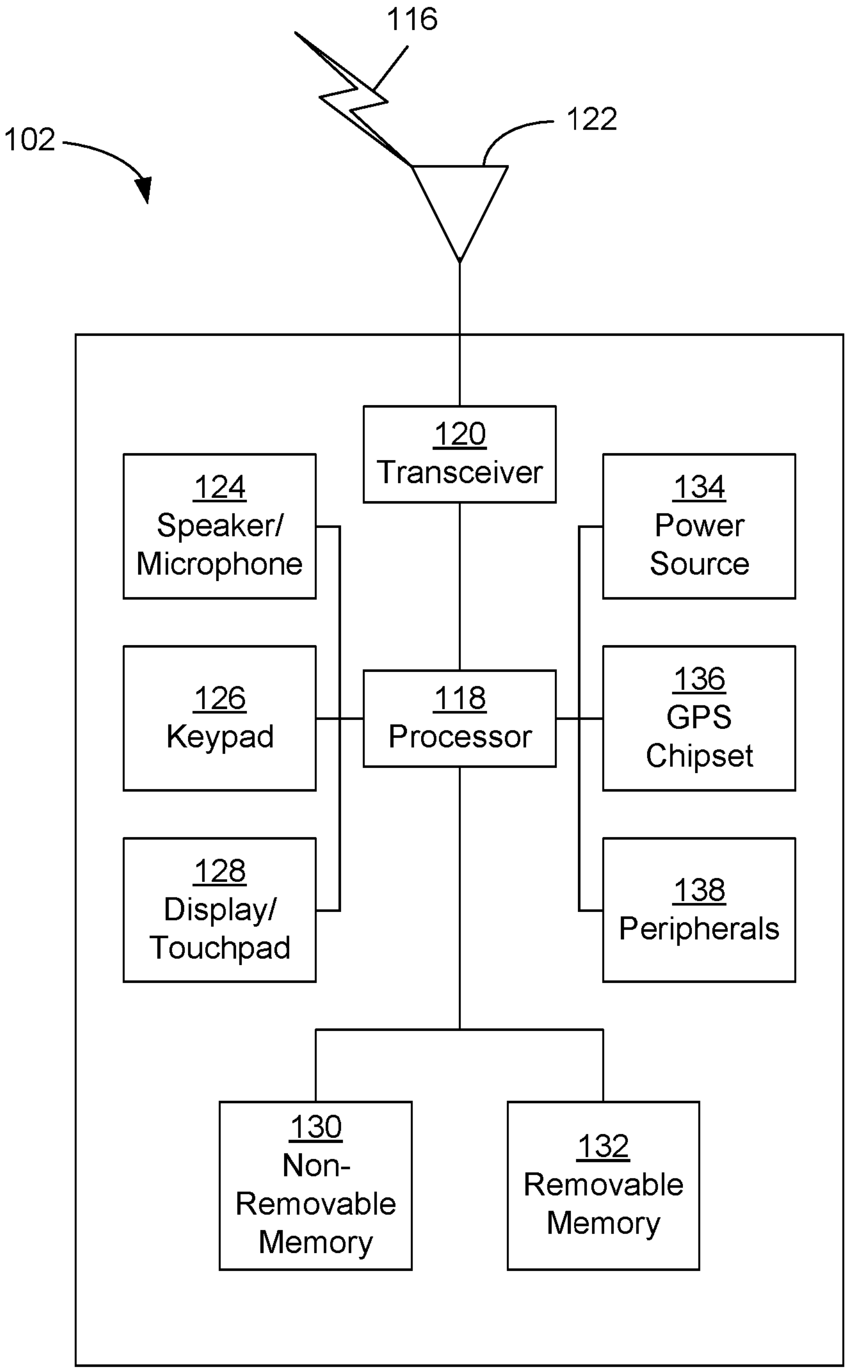
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
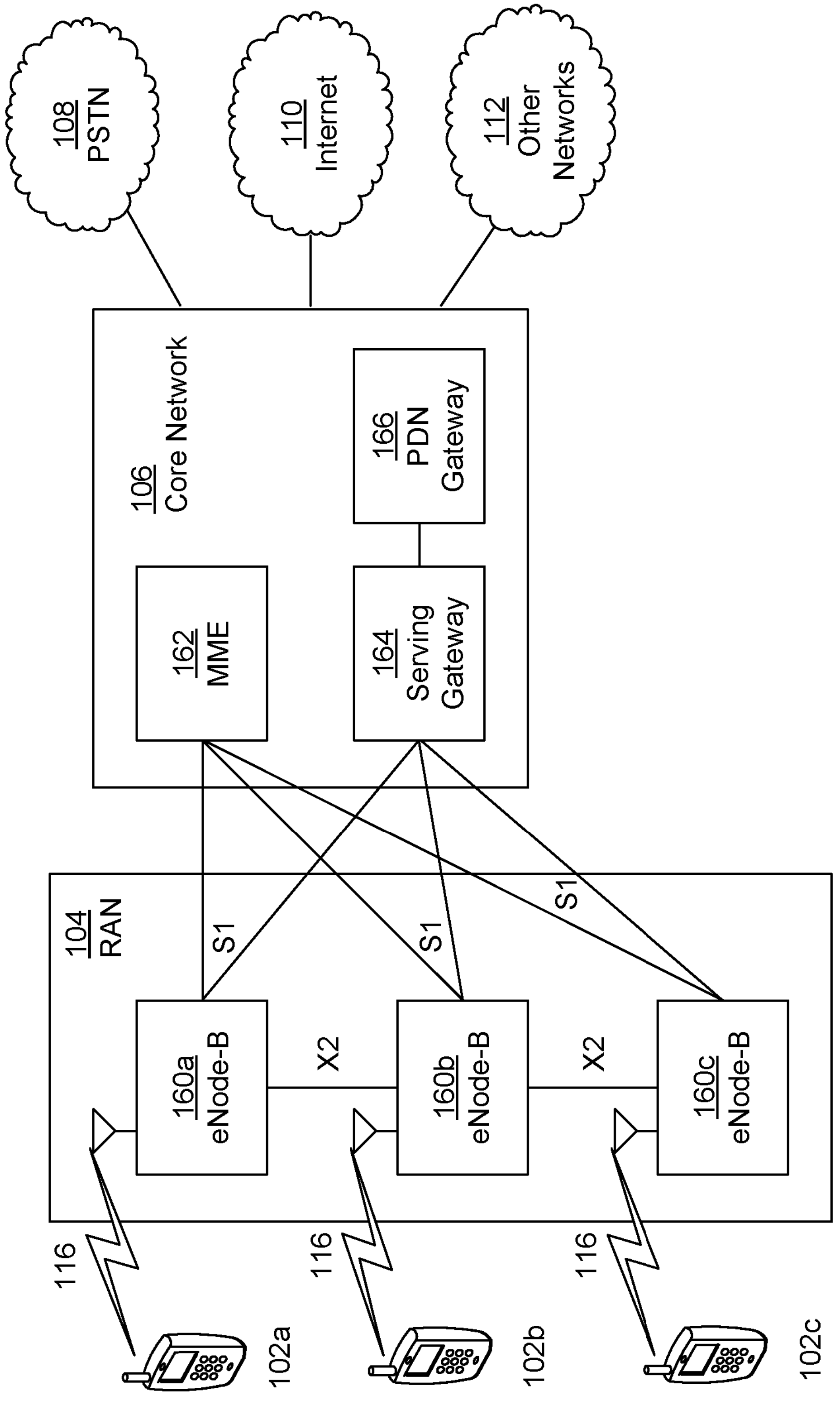
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
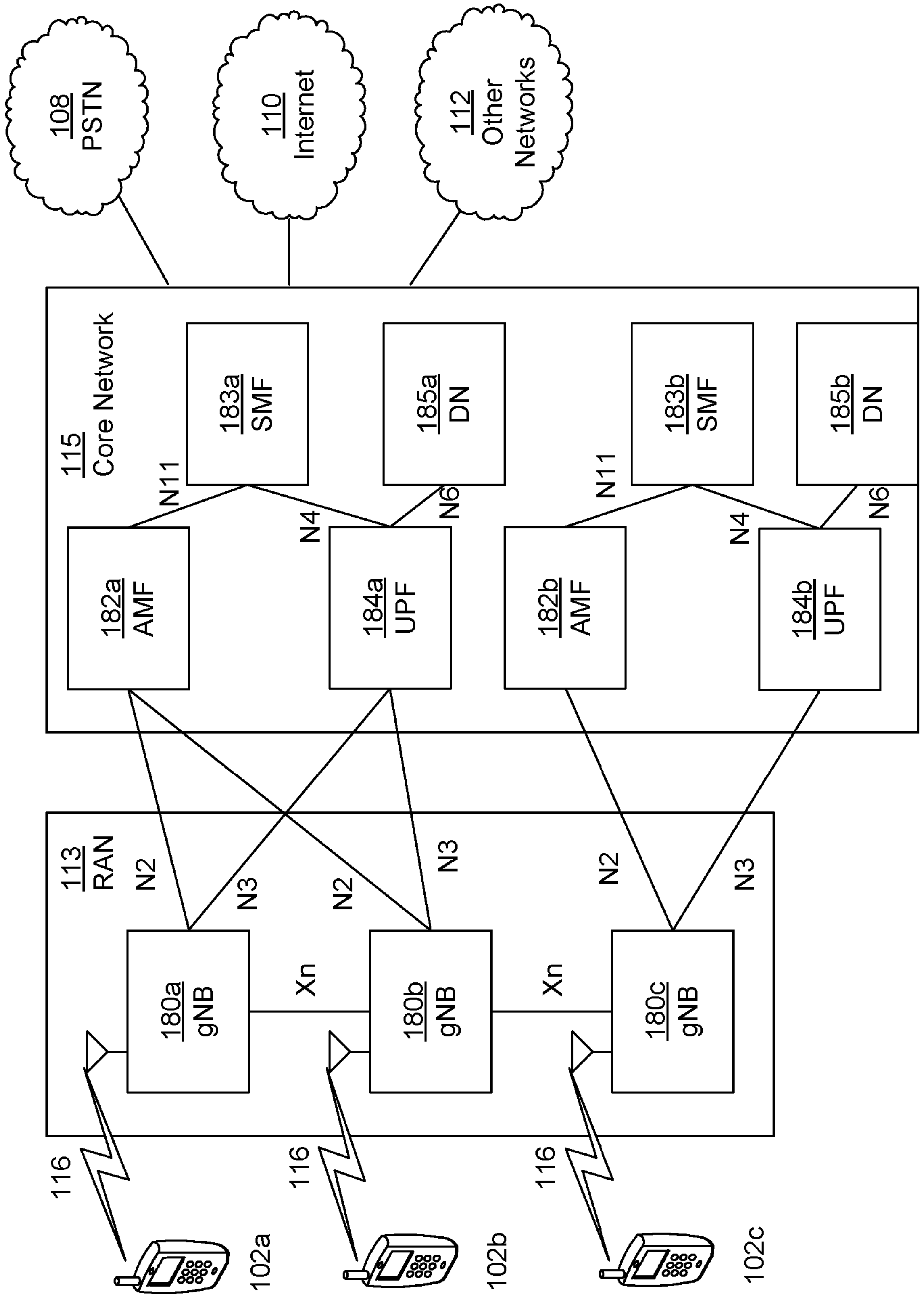
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-23 described herein may provide some examples, but other examples are contemplated. The discussion of FIGS. 5-23 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
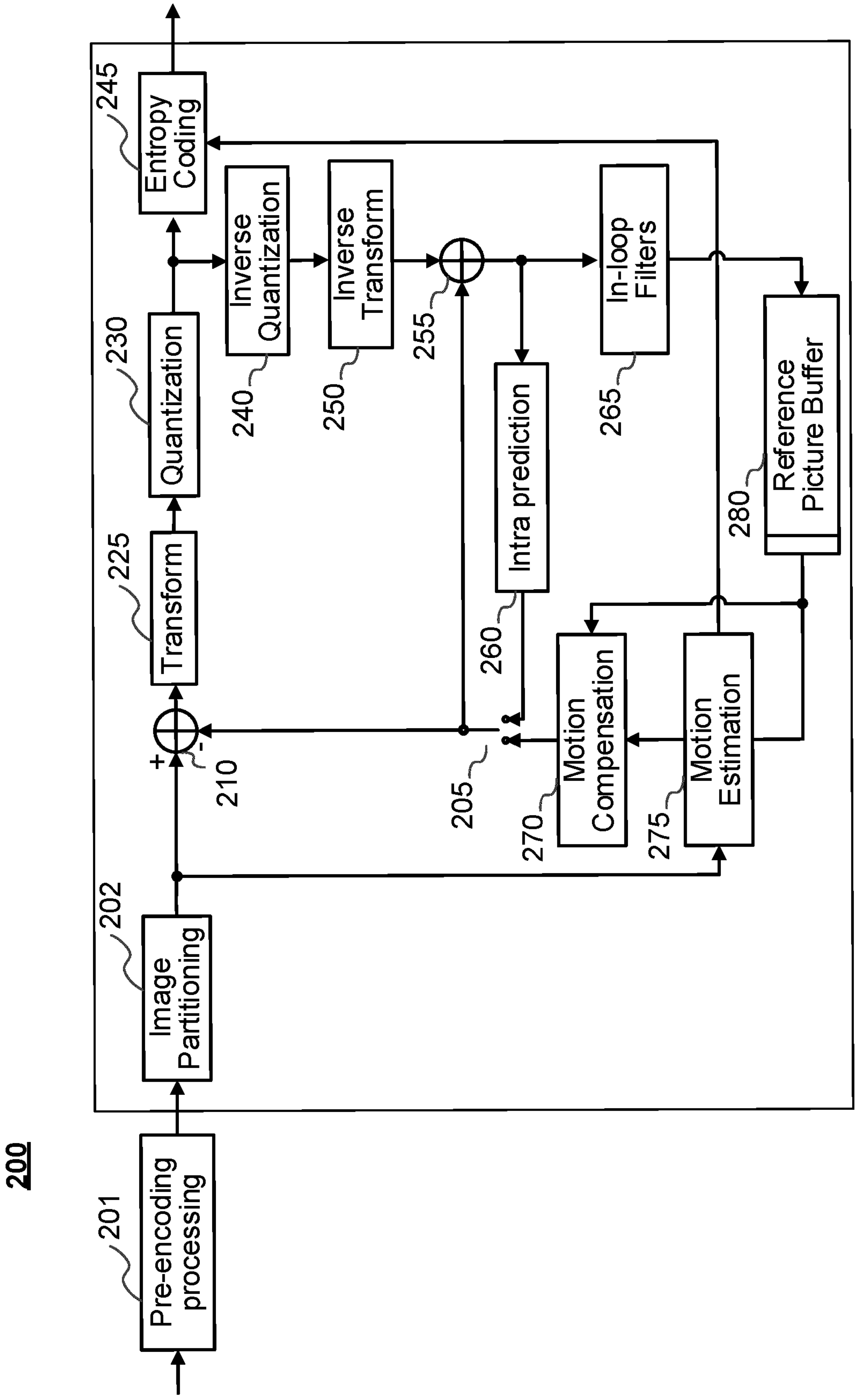
FIG. 2 illustrates an example video encoder.
Figure 3:
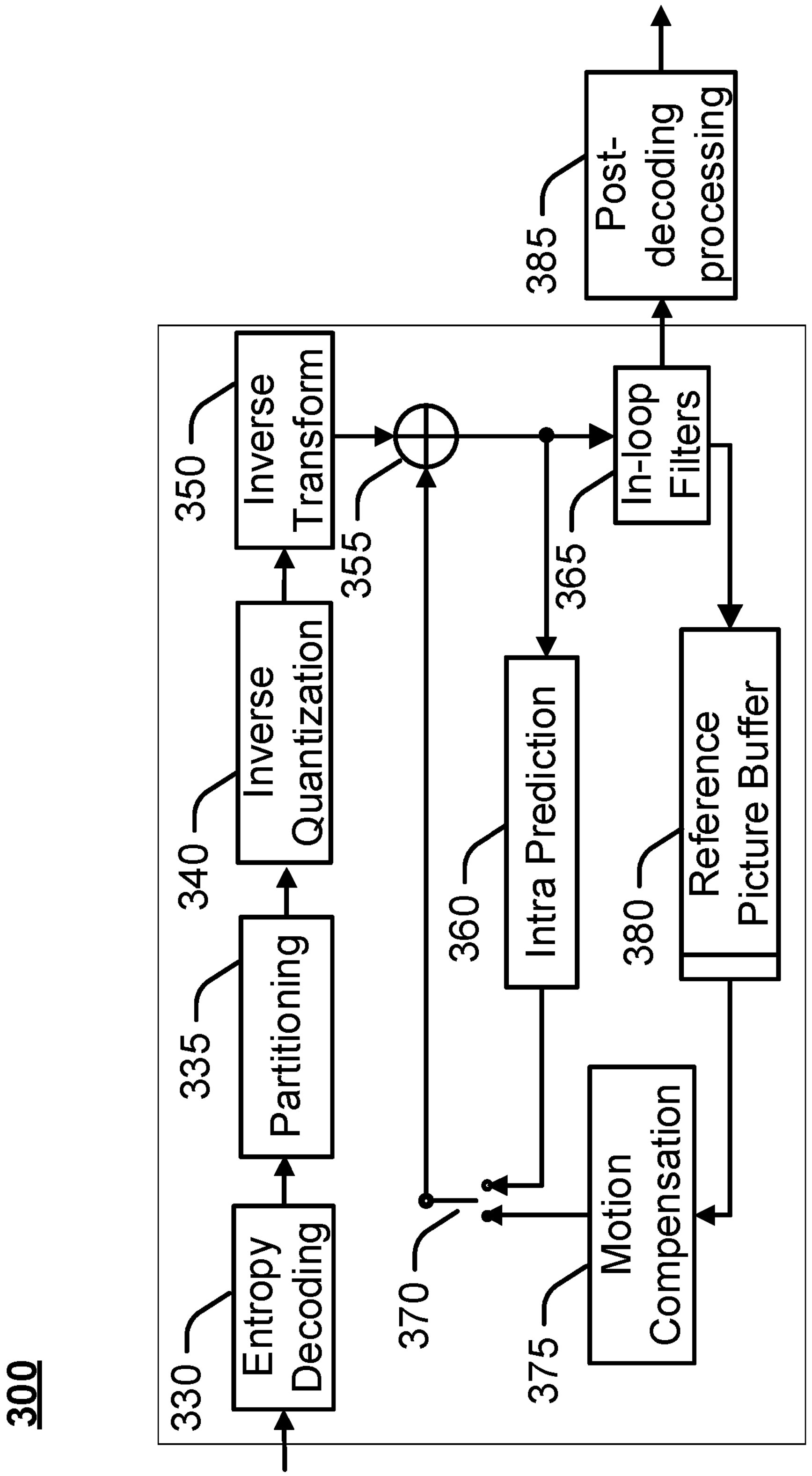
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as the number of intra prediction modes, the number of most probable modes (MPMs), additional intra prediction modes, block size dimensions, ratios of block height to block width, block shapes, prediction mode indices, wide angle intra prediction (WAIP) modes, degree of angles, angular mode ranges, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, such as picture partitioning information, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset)/ALF (Adaptive Loop Filter) filtering to reduce encoding artifacts. The filtered image is stored in a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, prediction modes, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380). In some examples, for a given picture, the contents of the reference picture buffer 380 on the decoder 300 side may be identical to the contents of the reference picture buffer 280 on the encoder 200 side (e.g., for the same picture).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
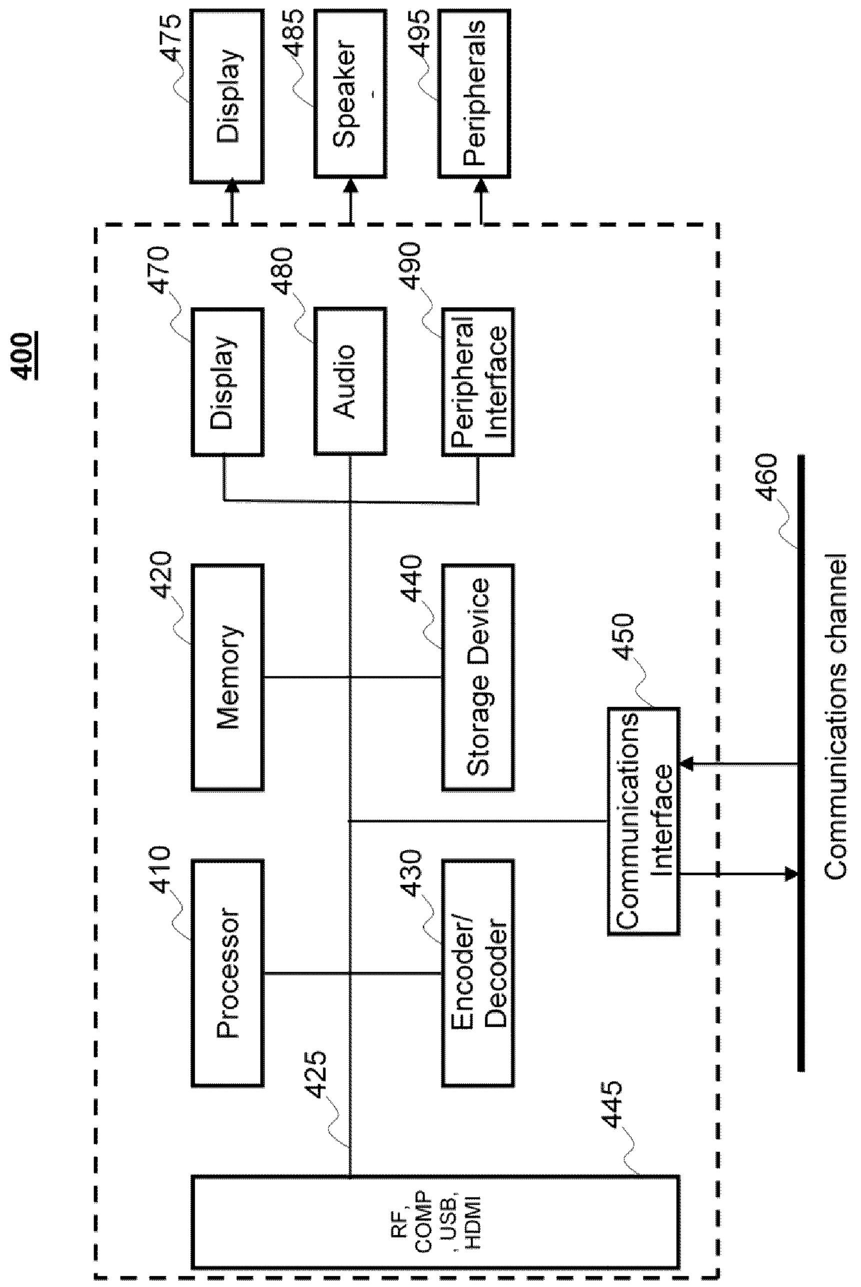
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (12C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples. Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, may include processes performed by a decoder of various implementations described in this application, for example: obtaining a most probable mode (MPM) list associated with a current block; determining a test list of intra prediction modes from the MPM list; testing a first intra prediction mode, wherein the first intra prediction mode is excluded from the test list or disallowed to be tested due to wide-angle intra prediction (WAIP) substitution; generating a prediction for the current block based on the tested intra prediction mode; and decoding the current block using the prediction, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, may include processes performed by an encoder of various implementations described in this application, for example: obtaining a most probable mode (MPM) list associated with a current block; determining a test list of intra prediction modes from the MPM list; testing a first intra prediction mode, wherein the first intra prediction mode is excluded from the test list or disallowed to be tested due to wide-angle intra prediction (WAIP) substitution; generating a prediction for the current block based on the tested intra prediction mode; and encoding the current block using the prediction, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on precision factors, shifts, number of fraction bits, intra prediction modes, indices, ranges, dimensions, weights, flags, computations, shapes, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, intra prediction mode indices (e.g., via MPM list-based signaling), etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g. using a monitor, screen, or other type of display) a resulting image (e.g., an image from residual reconstruction of the video bitstream). The TV, set-top box, cell phone, tablet, or other electronic device may receive a signal including an encoded image and perform decoding.

Intra prediction is a coding tool in video coding (e.g., hybrid video coding). Intra prediction may be used to make predictions for blocks. An encoder may select an (e.g., the best) intra prediction mode, for example, in terms of rate-distortion. The encoder may signal an index (e.g., an index associated with the selected intra prediction mode) to the decoder. A decoder can use the signaled index to perform the same prediction for a (e.g., each) block performed by the encoder. Signaling the index of the selected intra prediction mode may add extra overhead, reducing the gain from intra prediction. The index of the intra prediction mode selected to predict a given block may be coded to create a set of Most Probable Modes (MPMs), which may reduce the signaling overhead, for example, if the index of the selected intra prediction mode belongs to the list. Signaling an intra prediction mode index coded to create a set of MPMs may be referred to as MPM list-based signaling. Video coding, e.g., using VVC and/or HEVC, may be implemented with MPM list-based signaling. In other video coding implementations (e.g., ECM) multiple (e.g., two) MPM lists (e.g., instead of one MPM list) may be implemented. Herein, the signaling of a mode index, such as MPM list-based signaling, may be referred to as the signaling of a mode.

Signaling overhead may be (e.g., additionally and/or alternatively) limited (e.g., by ECM) using one or more tools based on (e.g., derived from) decoded pixels surrounding a given block (e.g., in intra prediction mode) that may be used (e.g., are likely the best) for predicting the block (e.g., in terms of rate-distortion). A first video coding tool may be Decoder-side Intra Mode Derivation (DIMD). A second video coding tool may be Template-based Intra Mode Derivation (TIMD). Signaling overhead may be reduced, for example, using the first and/or second tool. Signaling the tool may enable a decoder to obtain the indices of the (e.g., likely best) intra prediction modes. In examples (e.g., using DIMD), a template of decoded pixels above and/or on the left side of a current block may be analyzed to deduce the directionalities of the template, from which one or more (e.g., two) directional intra prediction modes may be selected. A prediction signal may be generated, for example, by blending multiple (e.g., two) modes with a planar mode. In examples (e.g., using TIMD), several intra prediction modes may be tested on a template of decoded pixels above and/or on the left side of a current block. One or more (e.g., two) modes yielding the smallest Sum of Absolute Transform Differences (SATDs) between the template of decoded pixels and the mode prediction of the template may be selected (e.g., retained or kept). A prediction signal may be generated, for example, by applying the mode with the smallest SATD or blending multiple (e.g., two) modes.

In examples (e.g., VVC and/or ECM, for non-square blocks), one or more (e.g., several) directional intra prediction modes may be substituted for one or more other intra prediction modes to obtain (e.g., the maximum) information from the decoded reference samples around the current block while keeping the same number of intra mode predictions, e.g., without increasing signaling overhead. TIMD may bypass signaling overhead. Substitution of intra prediction modes for TIMD may be adapted for rate-distortion efficiency.

Intra prediction mode signaling may be provided in various video coding tools (e.g., ECM) and TIMD. In examples, 67 intra prediction modes may be provided as core intra prediction modes. Arbitrary edge directions presented in video (e.g., natural video) may be captured by directional intra prediction modes. Additional directional intra prediction modes may be provided in one video coding, for example, 33 used in one video coding methodology (e.g., in HEVC) versus 65 used in a second video coding methodology (e.g., in VVC), or another number.

Figure 5:
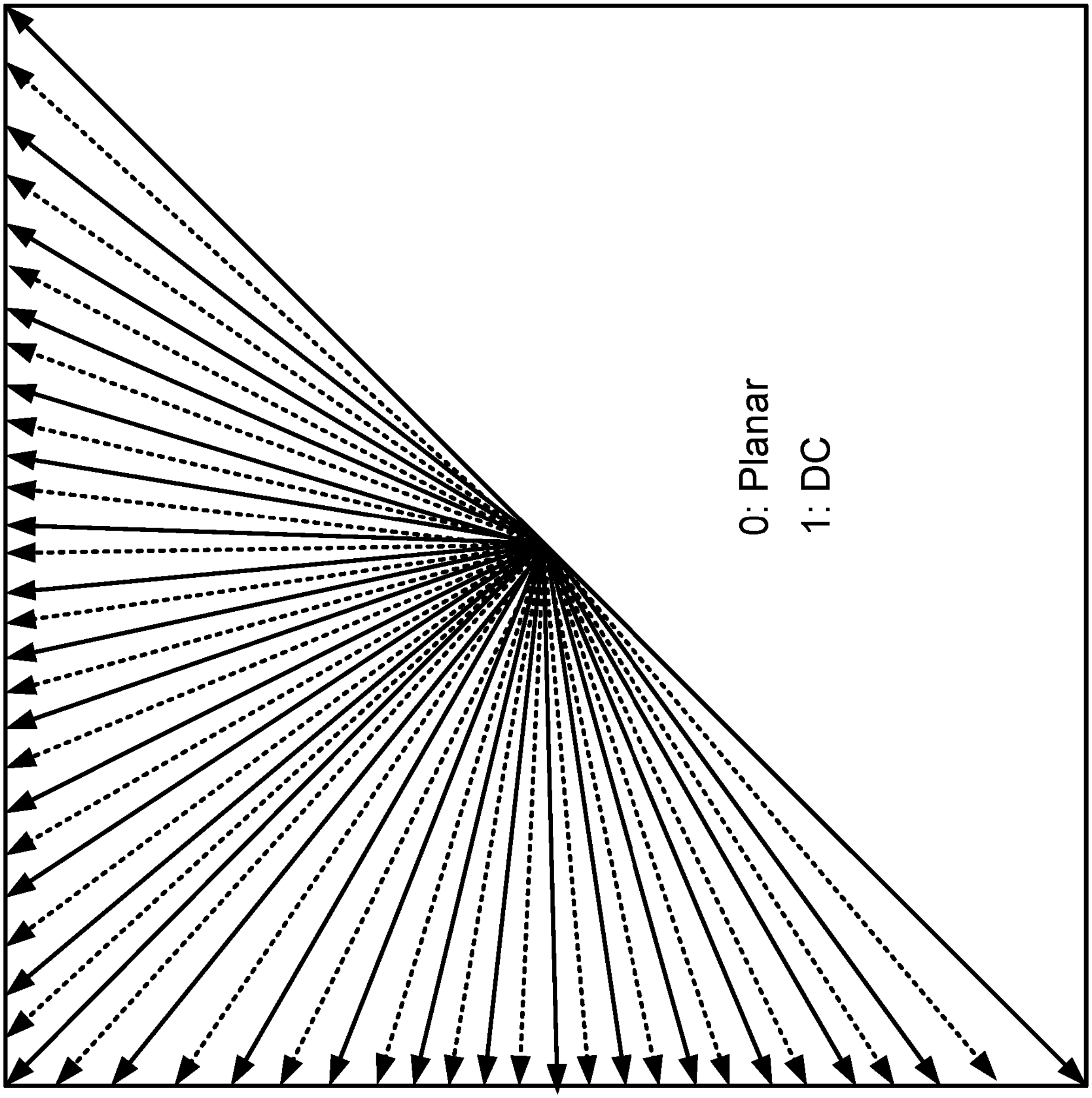
FIG. 5 illustrates an example of intra prediction modes in video coding tool set (e.g., versatile video coding (VVC) and enhanced compression model (ECM).

FIG. 5 illustrates an example of intra prediction modes in video coding implementations (e.g., WVC and ECM). Directional intra prediction modes are depicted as solid and dotted arrows in FIG. 5 to show various densities of intra prediction modes. For example, the solid lines in FIG. 5 may depict 33 intra prediction modes for HEVC while the combination of solid and dotted lines in FIG. 5 may depict 65 intra prediction modes in WVC. Directional intra prediction modes may be applied for one or more (e.g., all) block sizes and/or for luma and/or chroma intra predictions.

The planar mode and the DC mode may be similar in HEVC and VVC. In HEVC, an (e.g., each) intra-coded block may have a square shape. The length of each side of a square shape may have a power of two (2). Division operations (e.g., in DC mode) may not be implemented to generate an intra-predictor. Blocks may have a rectangular shape (e.g., in VVC). A division operation may be implemented per block (e.g., for rectangular shapes). A longer side may be used to compute the average for non-square blocks, for example, to avoid division operations (e.g., for prediction in DC mode).

In examples (e.g., in ECM), there may be 67 intra prediction modes. A directional intra prediction mode may include four-tap or six-tap interpolation. A directional intra prediction mode may include Position Dependent Intra Prediction Combination (PDPC), which may be supplemented with gradient PDPC.

Intra prediction mode signaling may be implemented, for example, in ECM. Intra prediction mode signaling may include signaling in luminance. An index may be signaled using an MPM list of a coding block (CB), for example (e.g., in ECM), if the intra prediction mode selected to predict the current luminance CB is not DIMD, not a Matrix-based Intra Prediction (MIP) mode, not TIMD, and/or is one of 67 intra prediction modes (e.g., as described herein). One or more tools, such as Block Differential Pulse Coded Modulation (BDPCM), Template-based Intra Prediction (TMP), Intra Block Copy (IBC), and/or Palette, may be ignored, for example, if the one or more tools are activated (e.g., exclusively) for one or more (e.g., specific) video sequences (e.g., screen content). An MPM list (e.g., in ECM) may be decomposed into a list of one or more (e.g., 6) primary MPMs and a list of one or more (e.g., 22) secondary MPMs, for example, as shown by example in FIGS. 6A and 6B. An MPM list may be built (e.g., sequentially built) by adding candidate intra prediction mode indices. The MPM list may be ordered from the candidate intra prediction mode index that is most likely to be the selected intra prediction mode for predicting the current luminance CB to the candidate intra prediction mode index that is least likely to be the selected as the intra prediction mode for predicting the current luminance CB.

Figure 6A:
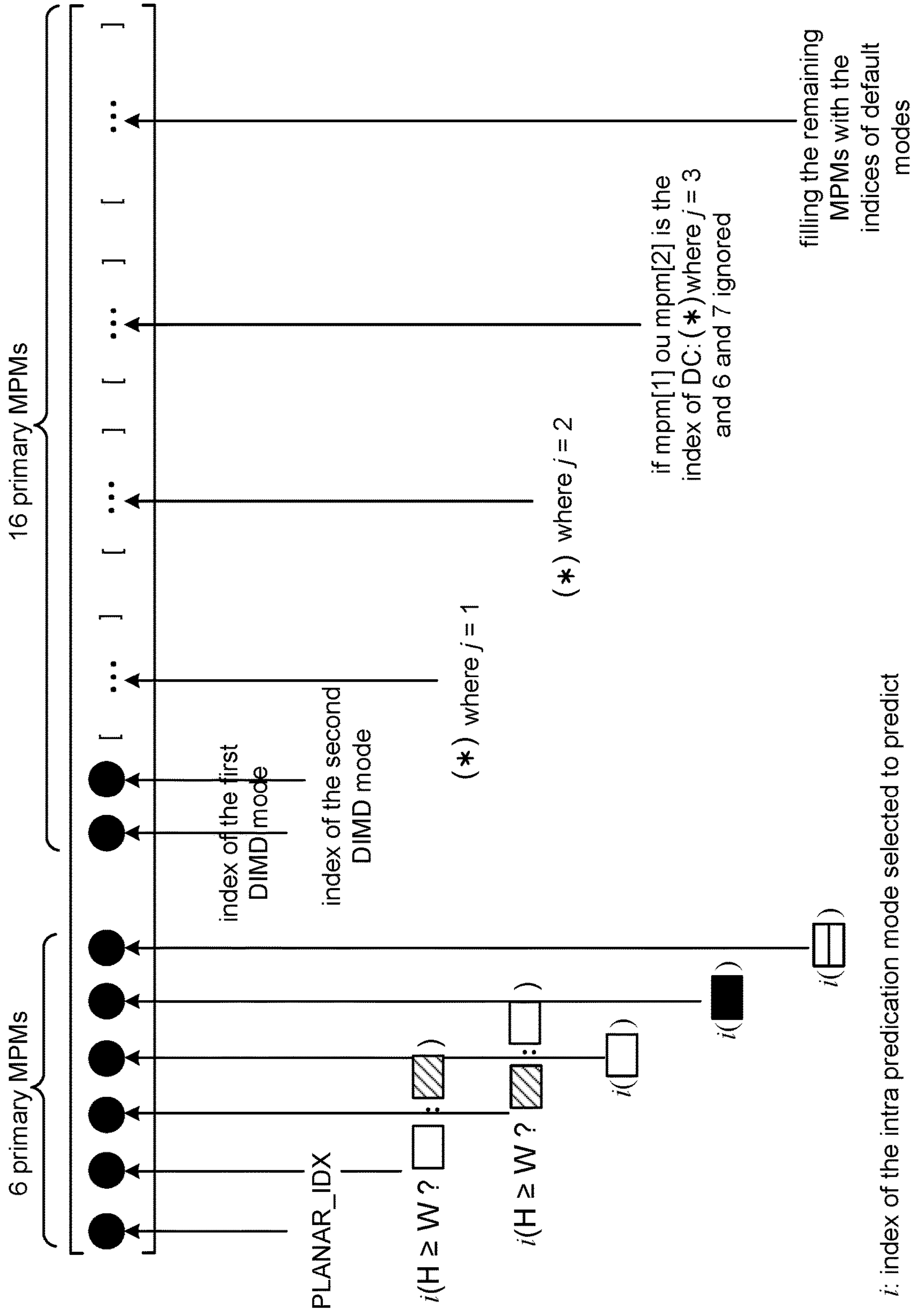
FIGS. 6A and 6B illustrate an example derivation of a most probable mode (MPM) list for a current luminance coding block (CB) belonging to an intra slice in ECM.
Figure 6B:
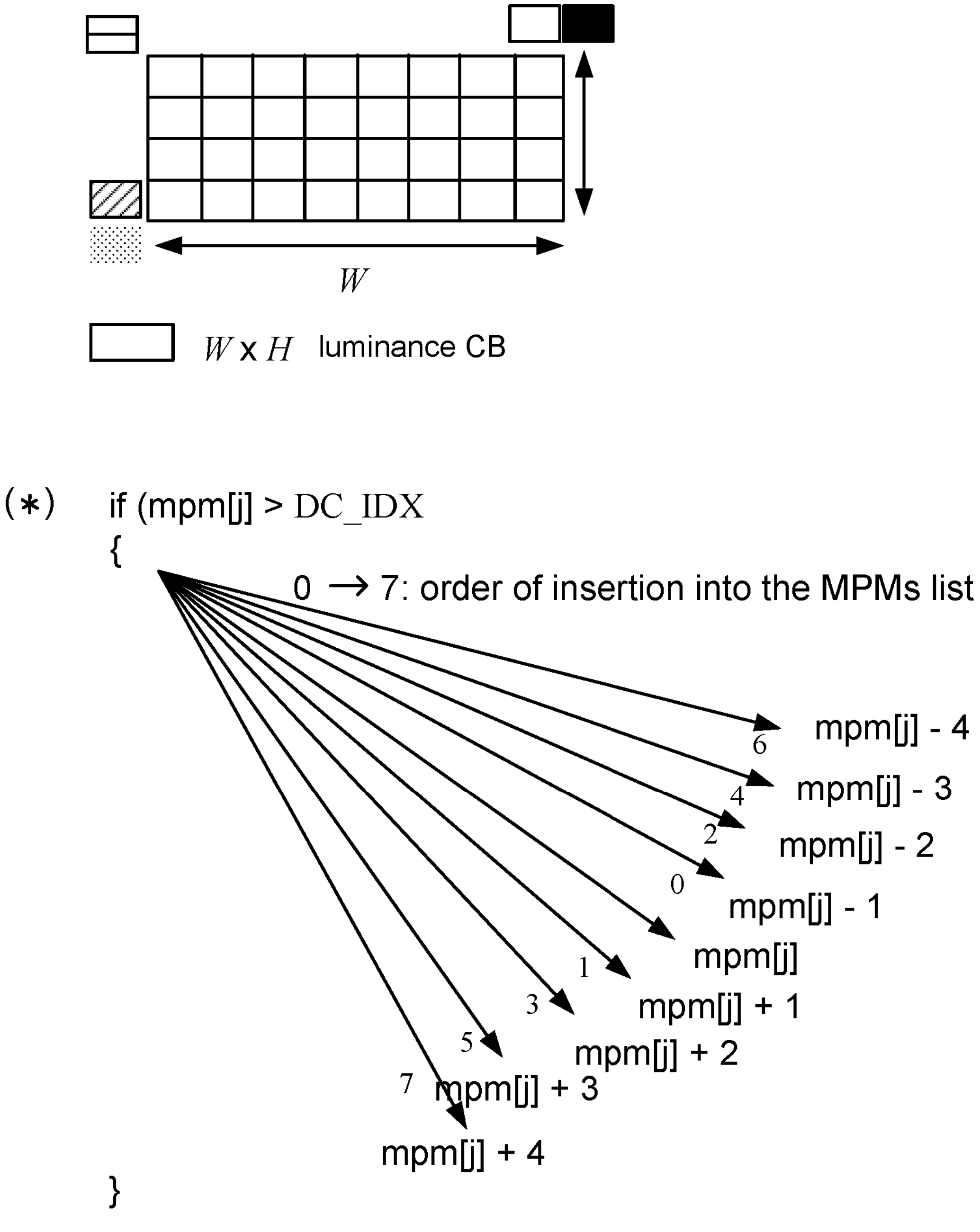

FIGS. 6A and 6B illustrate an example derivation of an MPM list for a current luminance CB belonging to an intra slice (e.g., as implemented in ECM).

FIGS. 6A and 6B show (e.g., from left to right) the (e.g., sequential) addition of candidate intra prediction mode indices, for example, where the current luminance CB belongs to an intra slice. Redundancy may not exist in the list of MPMs, e.g., there may not be identical intra prediction mode indices. FIGS. 6A and 6B illustrate an example where each candidate intra prediction mode index is different from one another. In examples, the slots of indices 0 to i−1 included in the list of MPMs may have already been filled. A candidate may be skipped, for example, if the current candidate intra prediction mode index already exists in the current list of MPMs, and the next candidate intra prediction mode may be inserted at the slot of index i, for example, if it does not exist in the list of MPMs. A current intra prediction mode index may be inserted at the slot of index i, for example, if the current intra prediction mode index does not exist in the list of MPMs, and the next candidate intra prediction mode index may be inserted at the slot of index i+1, for example, if the next candidate intra prediction mode index does not exist in the list of MPMs.

Figure 7A:
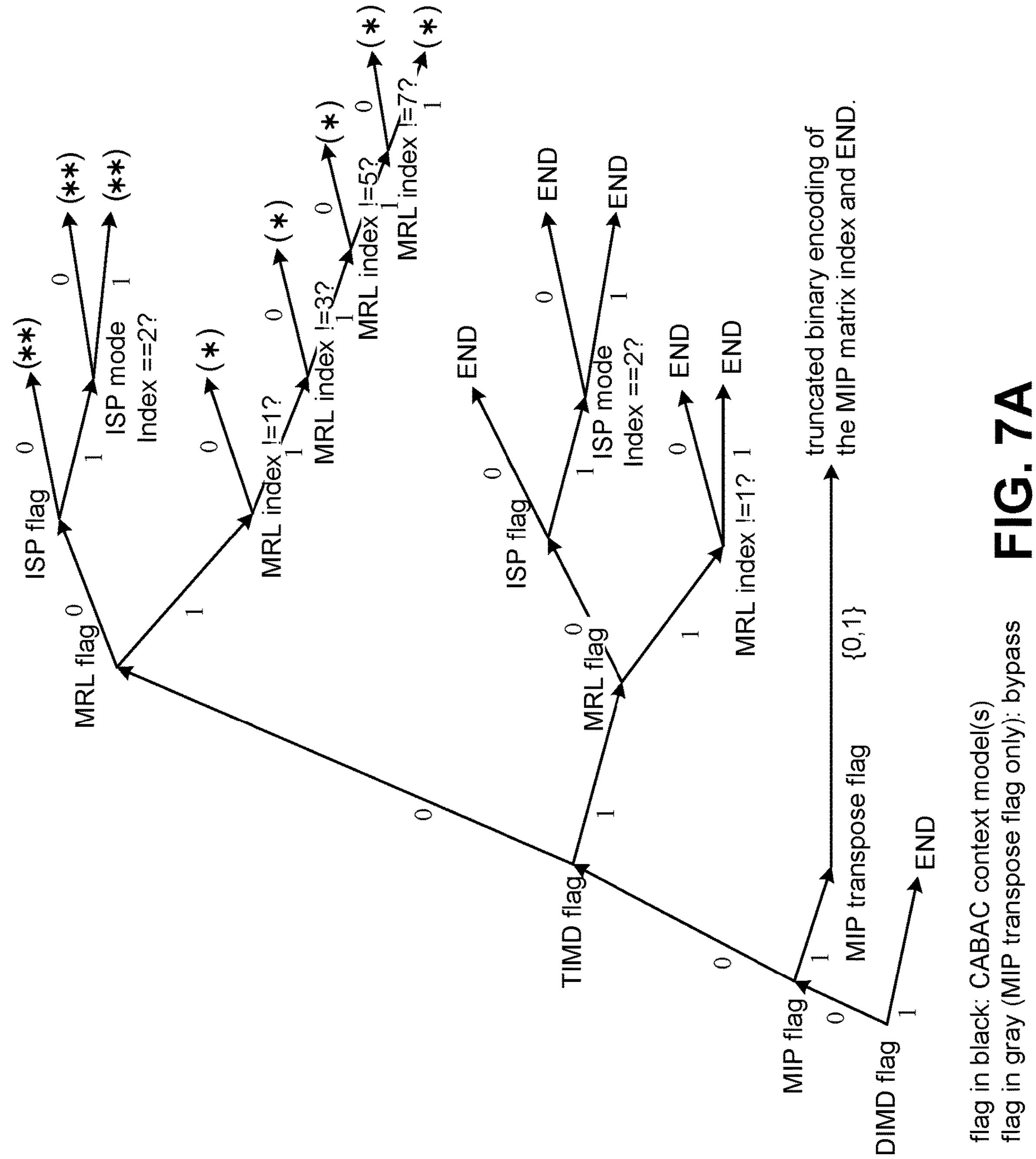
FIGS. 7A and 7B illustrate an example of signaling an intra prediction mode selected to predict the current luminance CB in ECM.
Figure 7B:
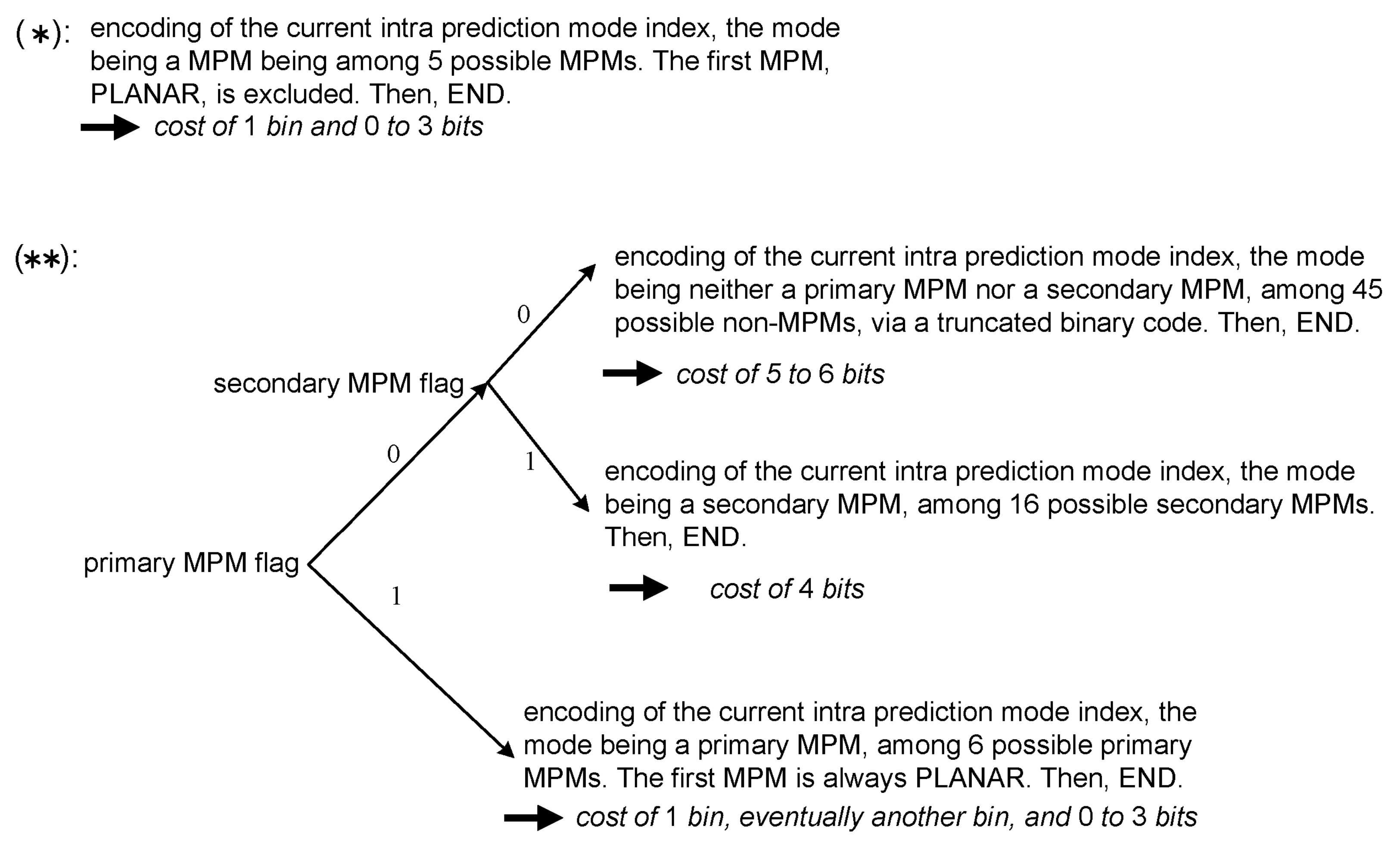

FIGS. 7A and 7B illustrate an example of signaling an intra prediction mode selected to predict the current luminance CB in ECM. The example shown in FIGS. 7A and 7B describes signaling an intra prediction mode selected to predict the current luminance CB on the encoder side. The example may be applicable to the decoder side. FIG. 7A refers to Multiple Reference Lines (MRL). As shown in FIG. 7A, an MRL index may belong to {0, 1, 3}, for example, if the TIMD flag equals 1. An MRL index equal to 0 may indicate that MRL is not used for predicting the current luminance CB. An MRL index equal to 1 may indicate that the second row of decoded reference samples above the current luminance CB and the second column of decoded reference samples on the left side of the current luminance CB are used for prediction. An MRL index equal to 3 may indicate that the fourth row of decoded reference samples above the current luminance CB and the fourth column of decoded reference samples on the left side of the current luminance CB are used for prediction. As shown in FIG. 7A, an MRL index may belong to {0, 1, 3, 5, 7, 12}, for example, if the TIMD flag equals 0. FIG. 7A refers to Intra Sub-Partition (ISP). As shown in FIG. 7A, an ISP mode index may belong to {0, 1, 2}. An ISP mode index equal to 0 may indicate that ISP is not used for the current luminance CB. An ISP mode index equal to 1 may indicate that the current luminance CB is split horizontally into luminance Transform Blocks (TBs). An ISP mode index equal to 2 may indicate that the current luminance CB is split vertically into luminance TBs. In the example shown in FIGS. 7A and 7B, one or more tools, such as BDPCM, TMP, IBC, and/or Palette, may be omitted, for example, if the tools are turned on for one or more video sequences.

Figure 8:
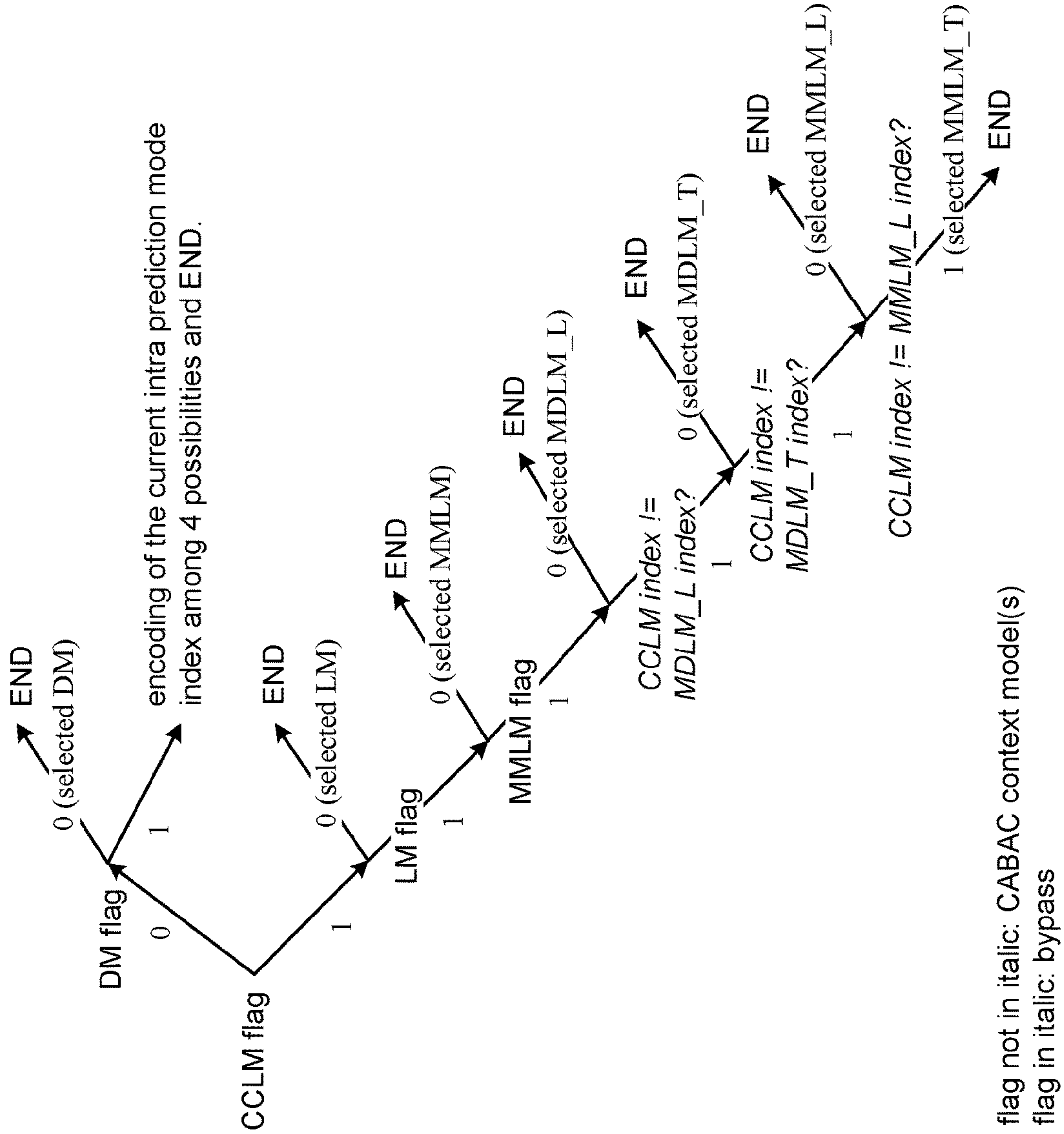
FIG. 8 illustrates an example of signaling an intra prediction mode selected to predict the current pair of chrominance CBs in ECM.

An intra prediction mode may be signaled for predicting chrominance. FIG. 8 illustrates an example of signaling an intra prediction mode selected to predict the current pair of chrominance CBs (e.g., as implemented in ECM). FIG. 8 illustrates an example of signaling an intra prediction mode that is selected to predict a current pair of chrominance CBs (e.g., collocated Cb and Cr CBs). As shown by example in FIG. 8, multiple (e.g., four) possibilities for a current intra prediction mode index may include an index of the planar mode, an index of the horizontal mode, an index of the vertical mode, and an index of DC, for example, if the Direct Mode (DM) flag equals 1. Redundancy in the set of (e.g., four) modes may be avoided, for example, if one of the set of modes is the DM. In such an example, the index of the redundant mode may be replaced by the index of the vertical diagonal mode. A Cross-Component Linear Model (CCLM) may include multiple (e.g., six) different intra prediction modes, such as LM, MMLM, MDLM_L, MDLM_T, MMLM_L, and MMLM_T, for example, in ECM. CCLM may include multiple (e.g., three) different intra prediction modes, for example, in VVC.

Wide Angle Intra Prediction (WAIP) may be implemented. One or more (e.g., several) angular intra prediction modes may be supplemented or replaced with wide angular modes, for example, as implemented for non-square blocks in VVC and/or ECM. Replaced modes may be signaled (e.g., using an original method) and remapped (e.g., after parsing) to the indexes of wide angular modes. In examples, the total number of (e.g., core) intra prediction modes may remain unchanged (e.g., 67).

Figure 9A:
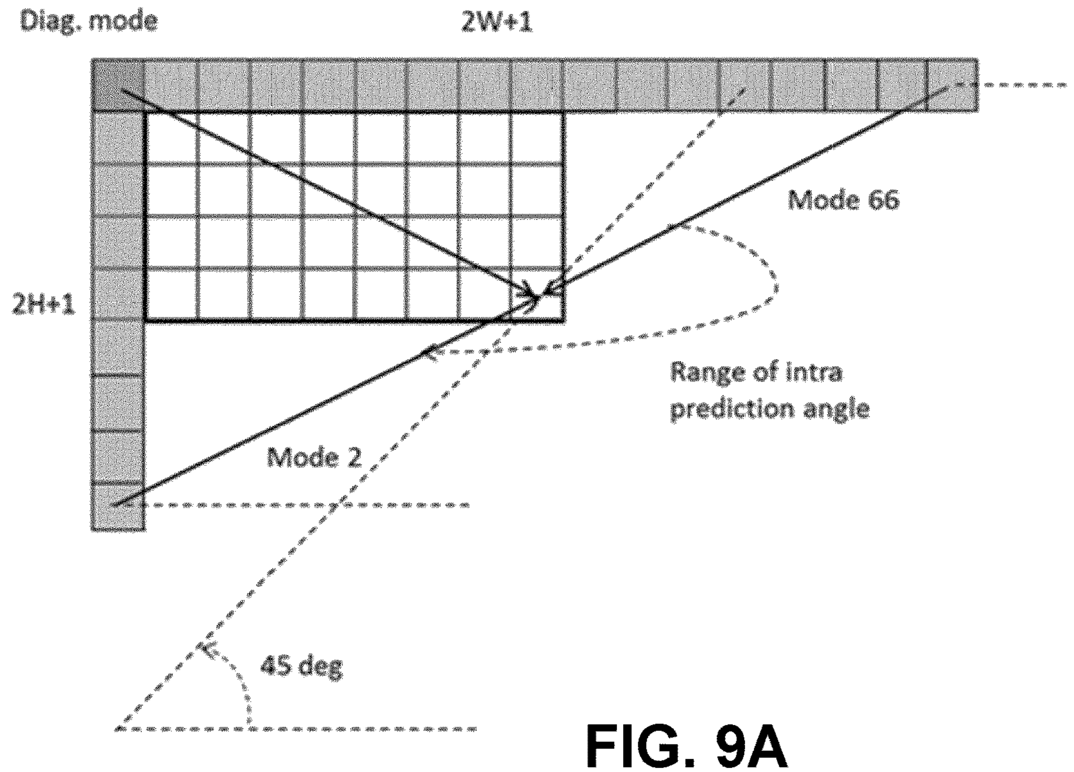
FIGS. 9A-9B illustrate an example relationship between the extent of a set of decoded reference samples around a current W×H block to be predicted and the range of allowed intra prediction angles.
Figure 9B:
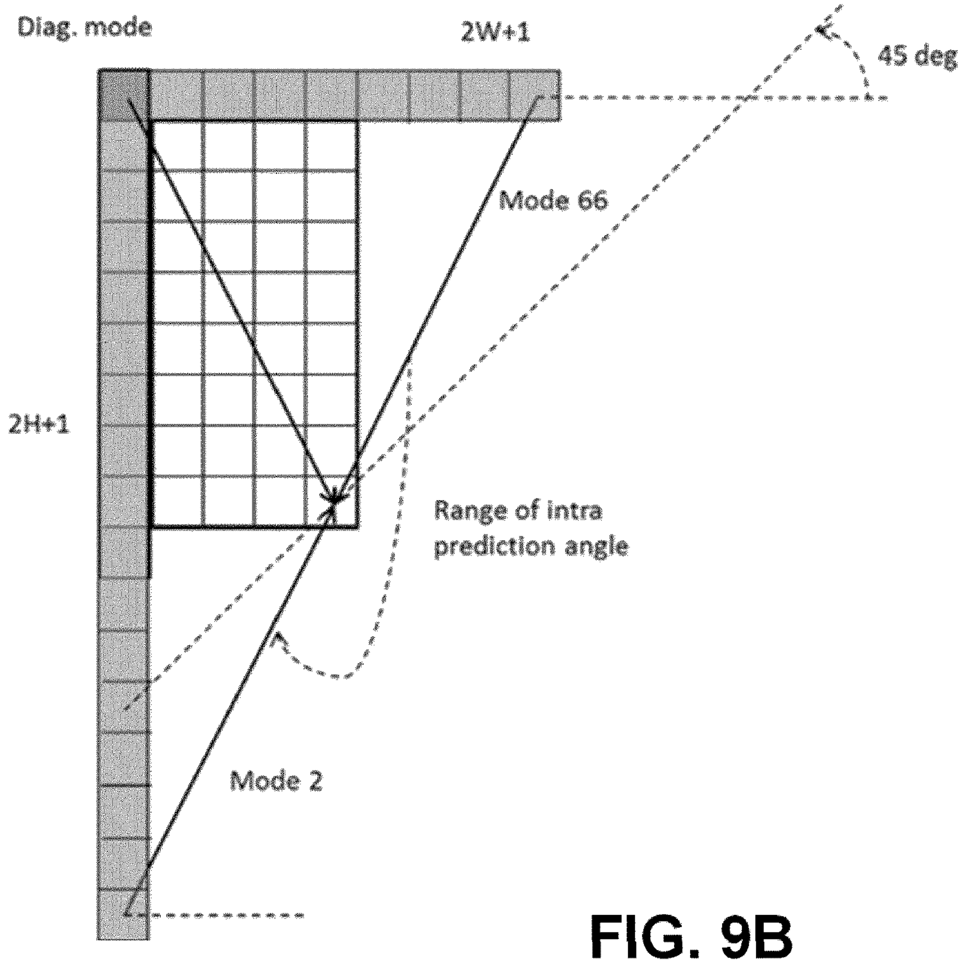

FIGS. 9A and 9B illustrate an example of a set of decoded reference samples for a current W×H block to be predicted, comprising an array of top decoded reference samples having a length equal to 2 W+1 and an array of left decoded reference samples having a length equal to 2H+1. FIGS. 9A and 9B show a relationship between the extent of decoded reference samples around the current W×H block and the range of allowed intra prediction angles.

Table 1 presents an example of indices for intra prediction modes replaced by wide-angular modes in WVC and ECM, for example, depending on the size of the current block to be predicted.

FIGS. 9A-9B illustrate an example relationship between the extent of a set of decoded reference samples around (e.g., surrounding) a current W×H block to be predicted and the range of allowed intra prediction angles.

TABLE 1

Example of indices for intra prediction modes replaced by wide-angular modes (e.g., as used in VVC and ECM), which may have, for example, 67 (e.g., core) intra prediction modes.

| condition | replaced intra prediction modes indices |
|---|---|
| W/H == 2 | 2, 3, 4, 5, 6, 7 |
| W/H == 4 | 2, 3, 4, 5, 6, 7, 8, 9, 10, 11 |
| W/H == 8 | 2, 3, 4, 5, 6, 7, 8, 9, 10, 11, 12, 13 |
| W/H == 16 | 2, 3, 4, 5, 6, 7, 8, 9, 10, 11, 12, 13, 14, 15 |
| W/H == 32 | 2, 3, 4, 5, 6, 7, 8, 9, 10, 11, 12, 13, 14, 15, 16 |
| W/H == 1 | none |
| H/W == 2 | 61, 62, 63, 64, 65, 66 |
| H/W == 4 | 57, 58, 59, 60, 61, 62, 63, 64, 65, 66 |
| H/W == 8 | 55, 56, 57, 58, 59, 60, 61, 62, 63, 64, 65, 66 |
| H/W == 16 | 53, 54, 55, 56, 57, 58, 59, 60, 61, 62, 63, 64, 65, 66 |
| H/W == 32 | 52, 53, 54, 55, 56, 57, 58, 59, 60, 61, 62, 63, 64, 65, 66 |

Figure 10:
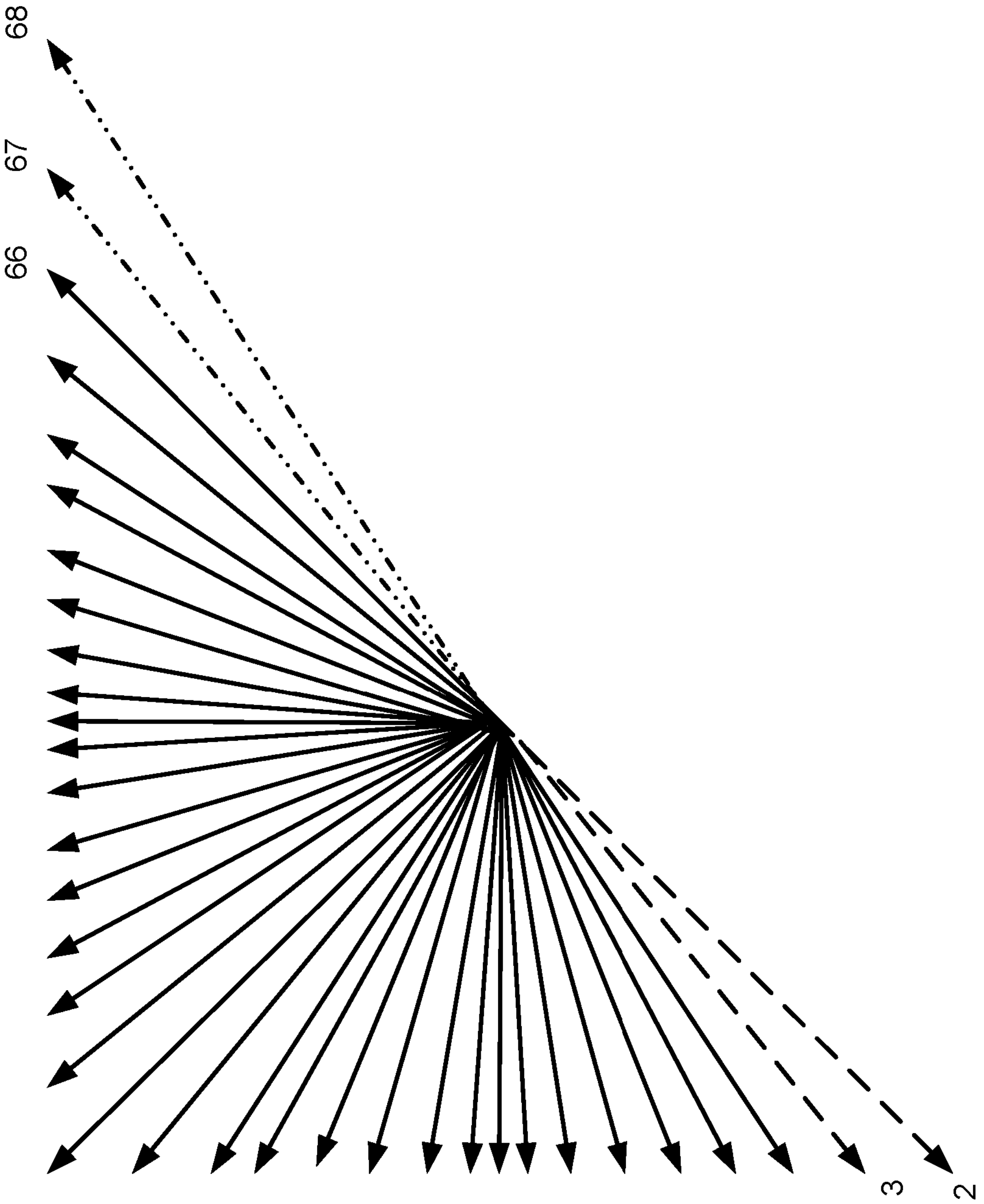
FIG. 10 illustrates an example of angular modes replaced by wide angular modes for a non-square block with a width larger than a height.

FIG. 10 illustrates an example of how angular intra modes may be replaced by wide angular modes for a non-square block with a width (e.g., strictly) larger than a height. As shown by example in FIG. 10, mode 2 may be replaced by wide angle mode 67. Mode 3 may be replaced by wide angle mode 68. For example, a current block to be predicted may be 8×4. A process of substitution may continue (e.g., incrementally) until mode 7 is replaced by wide angle mode 72.

Template-based Intra Mode Derivation (TIMD) may be implemented. Intra prediction mode derivation via TIMD may be applied (e.g., the same way) on encoder and decoder sides for a given luminance, such as CB (103) shown in FIG. 11A. An (e.g., each) intra prediction mode (e.g., supplemented with default modes) in the MPM list of the luminance CB may (e.g., if needed) compute a prediction of the template (1100 and 1101) of the luminance CB from the decoded reference samples of the template (1102). The SATD between the prediction and the template of the luminance CB may be calculated. The (e.g., two) intra prediction mode(s) with the minimum (e.g., smallest) SATDs may be selected as the TIMD mode(s). The set of directional intra prediction modes (e.g., for TIMD) may be extended (e.g., from 65 to 129), for example, by inserting a direction between each solid and neighboring dotted line in FIG. 5. The set of possible intra prediction modes derived via TIMD may gather 131 modes. One or more (e.g., two) intra prediction modes may be retained from the first pass of tests involving the MPM list may be supplemented with default modes. TIMD may (e.g., for each retained intra prediction mode that is not PLANAR or DC) test (e.g., in terms of prediction SATD) the (e.g., two) closest extended directional intra prediction mode(s). In examples, it may be assumed that the template of the luminance CB does not go out of the bounds of the current frame. FIGS. 11B and 11C show examples where at least a (e.g., one) portion of the template of the luminance CB goes out of the bounds of the current frame.

The current luminance CB may be predicted via TIMD, for example, by fusing the (e.g., two) predictions of the luminance CB via the (e.g., two) TIMD modes resulting from the (e.g., two) passes of tests with weights (e.g., after applying PDPC). The weights (e.g., computed weights) used may depend on the prediction SATDs of the (e.g., two) TIMD modes. In examples, the generated prediction may be based on computed weights. The computed weights may include a first computed weight associated with a tested first intra prediction mode and a second weight associated with a tested second intra prediction mode.

Figure 11A:
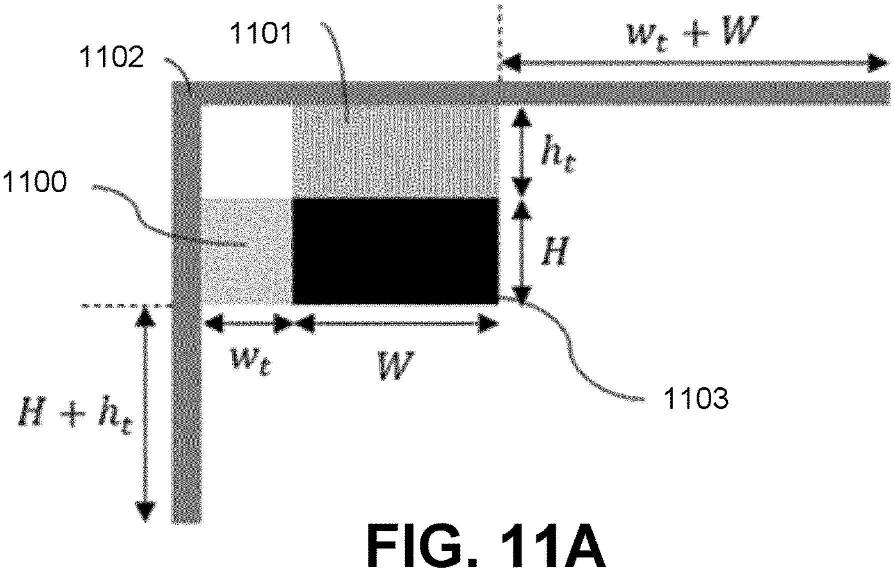
FIGS. 11A-11C illustrate examples of a template of the current luminance CB and decoded reference samples of the template.
Figure 11B:
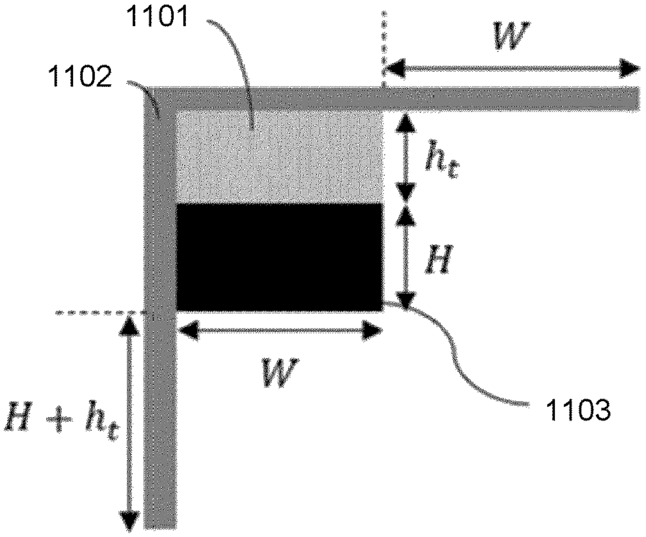
Figure 11C:
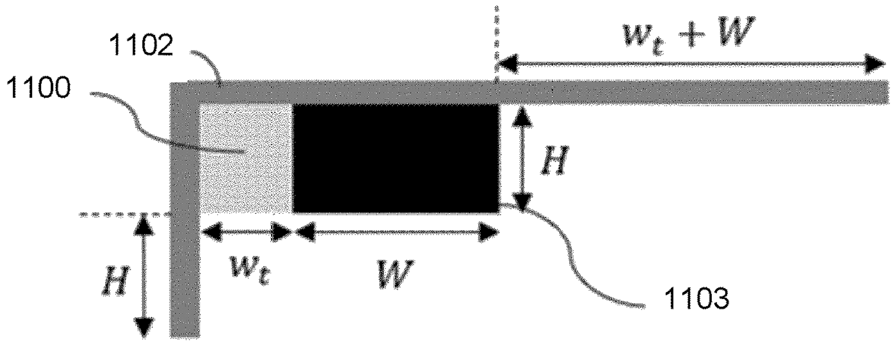

FIGS. 11A-11C illustrate examples of a template of the current luminance CB and decoded reference samples of the template. FIG. 11A shows an example where the current W×H luminance CB (1103) is surrounded by a fully available template, comprising a $w_t$×H portion on the left side (1100) and a W×$h_t$ portion (1101) above the current W×H luminance CB (1103). A tested intra prediction mode may (e.g., during the TIMD derivation step) predict the template of the current luminance CB from the set of 1+2 $w_t$+2 W+2$h_t$+2H decoded reference samples (1102) of the template. In an example (e.g., ECM), w; equals 2 if W≤8, and otherwise $w_t$ equals 4. In an example, $h_t$ equals 2 if H≤8, and otherwise $h_t$ equals 4. FIG. 11B shows an example where the current W×H luminance CB (1103) is surrounded by a template with a W×$h_t$ portion (1101) above the current W×H luminance CB (1103) available. A tested intra prediction mode may (e.g., during the TIMD derivation step) predict the template of the current luminance CB from the set of 1+2 W+2$h_t$+2H decoded reference samples (1102) of the template. FIG. 11C shows an example where the current W×H luminance CB (1103) is surrounded by a template with a $w_t$×H portion (1100) on the left side available. A tested intra prediction mode may (e.g., during the TIMD derivation step) predict the template of the current luminance CB from the set of 1+2$w_t$+2 W+2H decoded reference samples (1102) of the template.

A set of directional intra prediction modes may be extended from 65 to 129, for example, for TIMD. An intra prediction mode substitution in WAIP may be adapted, for example, as shown in Table 2. For example, a given 8×4 luminance CB may use TIMD. Mode 2 may be replaced by wide angle mode 131, mode 3 may be replaced by wide angle mode 132, mode 4 may be replaced by wide angle mode 133, . . . , mode 12 may be replaced by wide angle mode 141, etc. Multiple indices of intra prediction modes may be generated, and the multiple indices of intra prediction modes may be used to generate the prediction for the current block. Weights of the multiple indices of intra prediction modes may be computed. One of the weights may be a sum of absolute transform differences (SATDs), and the prediction for the current block may be generated based on a subset of indices of intra prediction modes with a smallest prediction SATD from the multiple indices of intra prediction modes.

TABLE 21

Example of indices for intra prediction modes replaced by wide-angular modes in TIMD in ECM.

| condition | replaced intra prediction modes indices |
|---|---|
| W/H == 2 | $[\![2, 12]\!]$ |
| W/H == 4 | $[\![2, 20]\!]$ |
| W/H == 8 | $[\![2, 24]\!]$ |
| W/H == 16 | $[\![2, 28]\!]$ |
| W/H == 32 | $[\![2, 30]\!]$ |
| W/H == 1 | none |
| H/W == 2 | $[\![120, 130]\!]$ |
| H/W == 4 | $[\![112, 130]\!]$ |
| H/W == 8 | $[\![108, 130]\!]$ |
| H/W == 16 | $[\![104, 130]\!]$ |
| H/W == 32 | $[\![102, 130]\!]$ |

Template-based Intra Mode Derivation (TIMD) may be implemented. TIMD may be implemented with extended WAIP. Tested intra prediction modes may be selected from an MPM list of a current luminance CB during a TIMD derivation process. Selected intra prediction modes may be supplemented with default modes. A selected mode may (e.g., if needed) undergo a WAIP substitution (e.g., as described herein). A tested intra prediction mode may not be removed by a wide-angle process, for example, if/when TIMD applies to a non-square luminance CB.

The efficiency of TIMD may be improved, for example, by making one or more (e.g., all) intra prediction modes (e.g., wide angle or not) available for TIMD. In examples (e.g., implementations), the number of modes tested may be restrained to reduce the complexity of a search for the best TIMD candidate. Examples (e.g., all examples) may be implemented without extra signaling regardless of the chosen modes.

Directional intra prediction modes replaced by WAIP for a rectangular CU may be allowed. In examples (e.g., as shown in FIGS. 12A-12B), intra prediction modes that were replaced (e.g., due to a wide-angle process when doing TIMD on a rectangular CU) may be allowed.

Figure 12A:
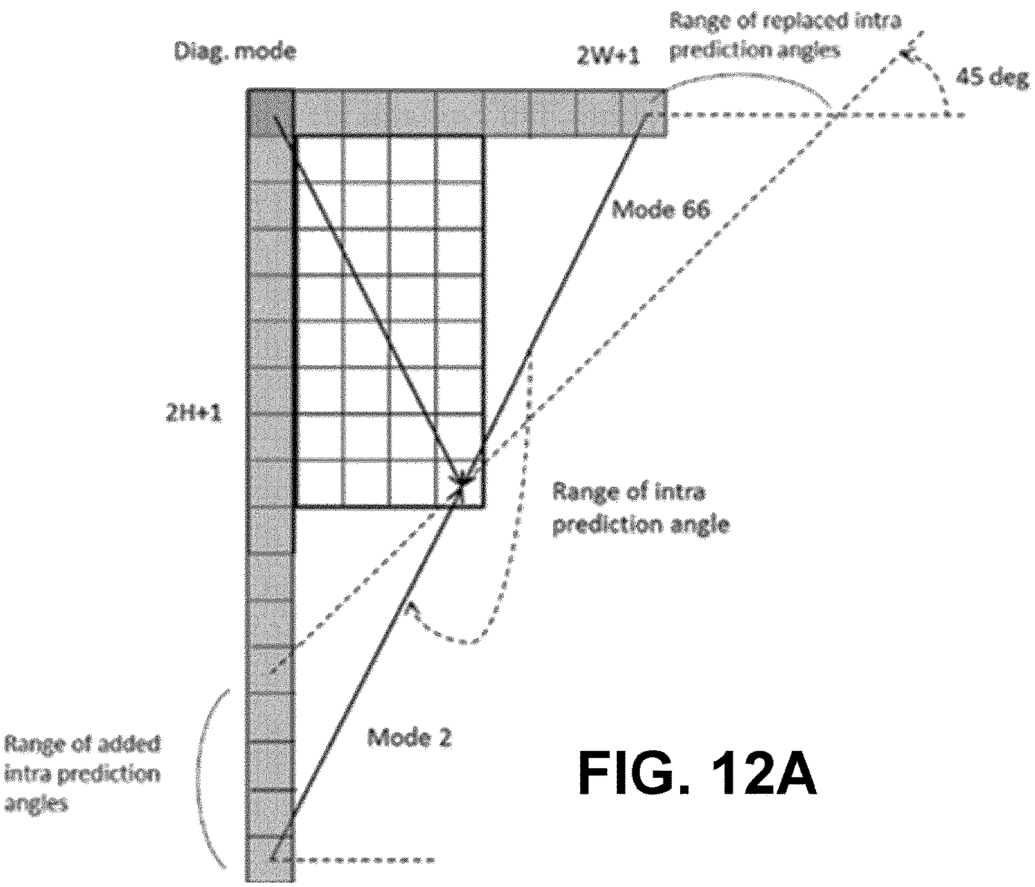
FIGS. 12A-12B illustrate an example of a range of directions added by wide-angle intra prediction (WAIP) and a range of directions replaced by WAIP.
Figure 12B:
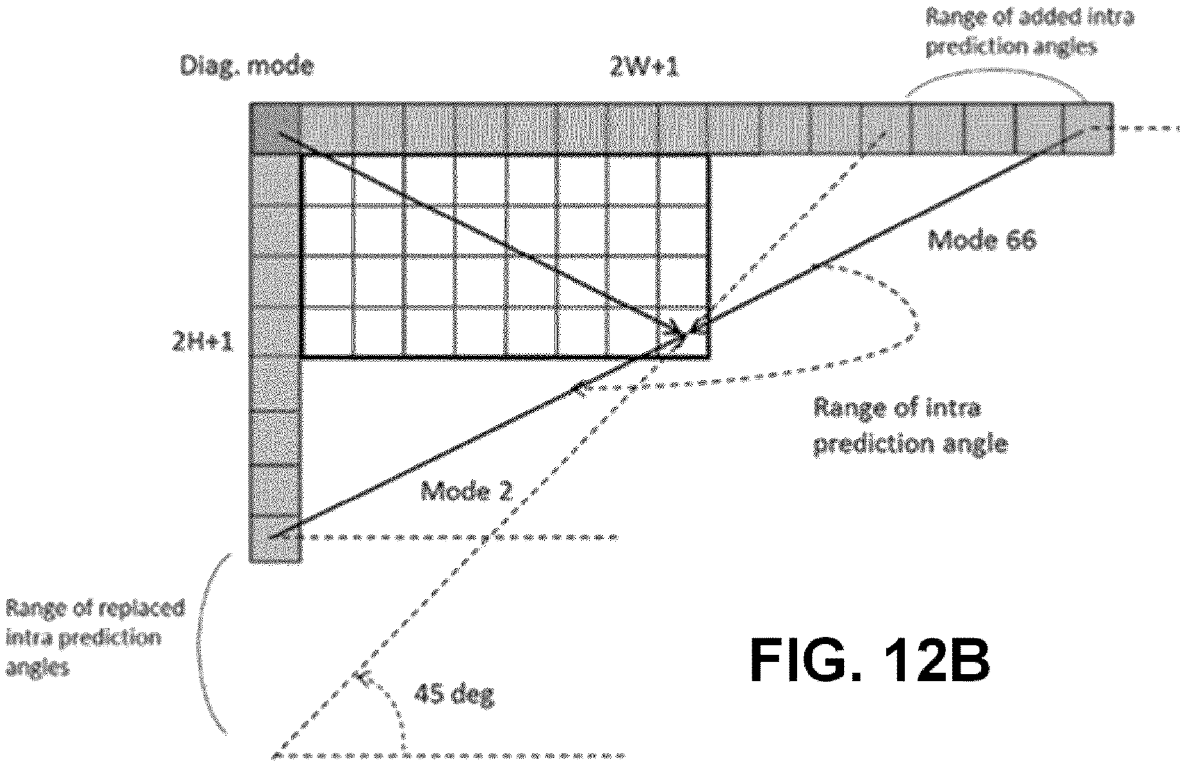

FIGS. 12A-12B illustrate an example of a range of directions added by WAIP and a range of directions replaced by WAIP. The range of directions replaced by WAIP may be allowed.

In an example (e.g., based on Table 2), a range of intra prediction modes indices $[\![2, 28]\!]$ may be allowed for a current 16×4 luminance CB using TIMD. The range of intra prediction modes indices generated by a WAIP process (e.g., $[\![131, 157]\!]$) may (e.g., also) be allowed. In an (e.g., another) example, a range of intra prediction modes indices $[\![2, 30]\!]$ may be allowed for a current 32×4 luminance CB using TIMD. The range of intra prediction modes indices arising from the WAIP process (e.g., $[\![131, 159]\!]$) may (e.g., also) be allowed. In examples, the span of the directional intra prediction modes in TIMD in ECM may be used. Examples (e.g., as described herein) may be extended to a (e.g., any) span of directional space for the intra prediction modes. In examples (e.g., as described herein), an implementation (e.g., using TIMD) may be adapted to a density of directional intra prediction modes four times larger than the density shown by example in FIG. 5, which may be implemented, for example, by adding three directions between each solid line and neighboring dotted line in FIG. 5.

Intra prediction modes allowed for CUs of close shapes may be allowed for CUs of other sizes. Modes that would be authorized for other CUs with close shapes may be allowed, for example, if/when performing TIMD on a CU of a size.

For example, TIMD may be performed on a square CU. Wide angles that may be allowed for CUs of width/height ratio of 1/2 or 2/1 may be allowed, for example, in addition to other intra prediction modes (e.g., without limiting the TIMD search). For example, a TIMD may be performed on a CU with width/height ratio of 2/1 (e.g., or 1/2). The modes allowed in TIMD may include modes that may be allowed for a CU with width/height ratio of 4/1 or 1/1 (e.g., or 1/4 or 1/1).

In an example, a current 4×4 luminance CB may use TIMD. As described herein, wide angles that would be allowed for an 8×4 luminance CB and/or for a 4×8 luminance CB may (e.g., additionally) be allowed for the 4×4 luminance CB. For example, TIMD applied to a 4×4 luminance CB may use (e.g., in addition to intra prediction modes allowed for a 4×4 luminance CB) 10 modes in the added range in the right part of FIGS. 12A and 12B and 10 modes in the added range in the left part of FIGS. 12A and 12B.

Figure 13:
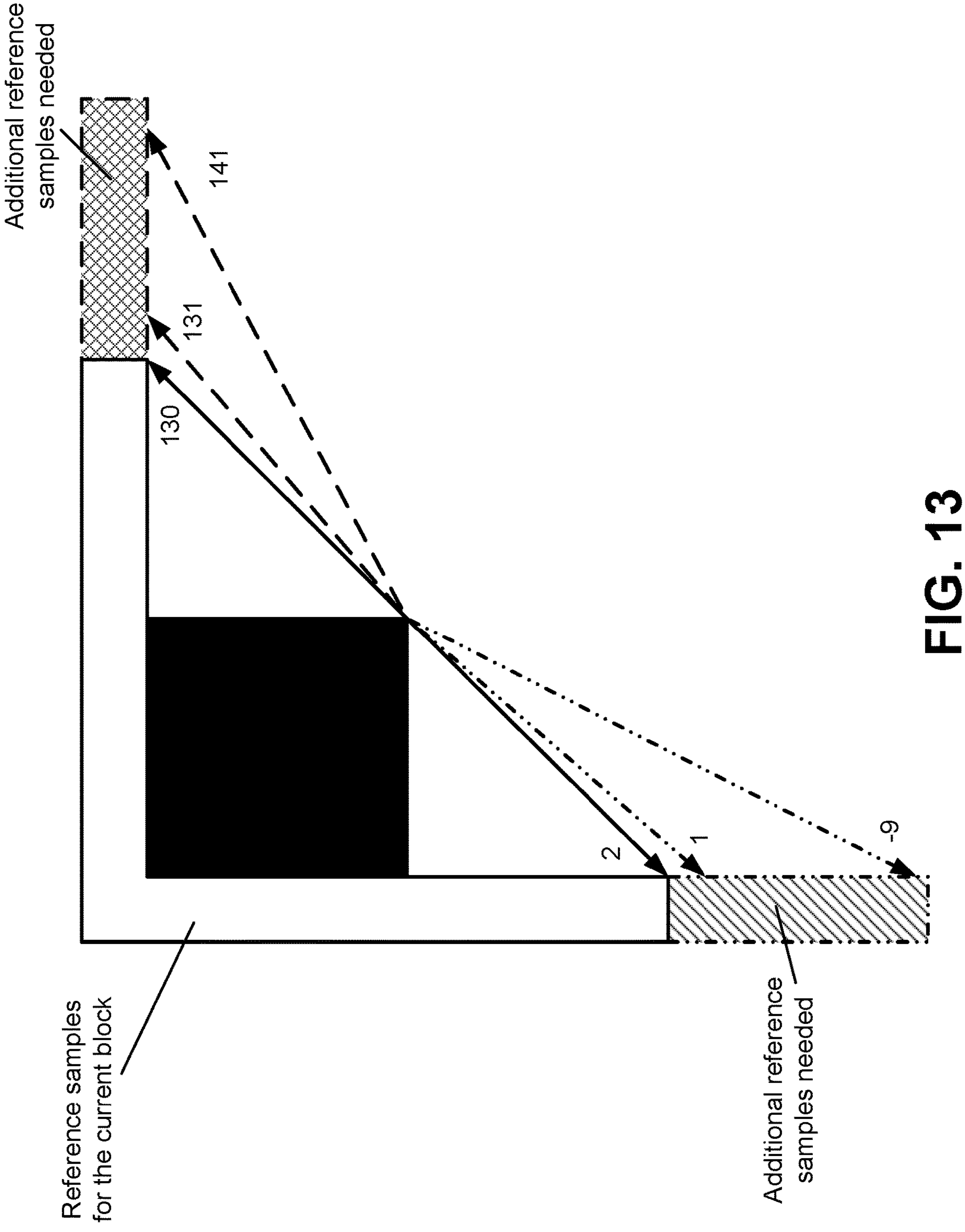
FIG. 13 illustrates an example of a range of directions added by WAIP and a range of directions replaced by WAIP when a reference sample for a current block is square.

FIG. 13 illustrates an example of a range of directions added by WAIP and a range of directions replaced by WAIP when a reference sample for a current block is square. The current block may be associated with a first shape, and a first intra prediction mode (e.g., the mode excluded from the test list or disallowed to be tested due to WAIP substitution) may be associated with a second shape. The second shape may be associated with the directions replaced by WAIP. For example, with a rectangular block, before replacing modes, the modes may be rectangular. With WAIP substitution, for example, the replaced modes may correspond with a shape (e.g., a shape that is square). In FIG. 13, for example, mode 2 may be at 45 degrees and follow the characteristics of using a square block. The first shape may be square, and the second shape may be rectangular. Adjacent sides of the second shape may differ in length from one another. FIG. 13 illustrates that an intra prediction mode (e.g., a potential intra prediction mode) may be used for a current block using TIMD. The WAIP modes reserved for neighboring block sizes (e.g., W/H=2 (modes 131 to 141) and W/H=0.5 (modes 1 to −9) may be allowed or included in the TIMD search for the current block, and, for example, when W/H=4 and W/H=0.25, etc.

Figure 14:
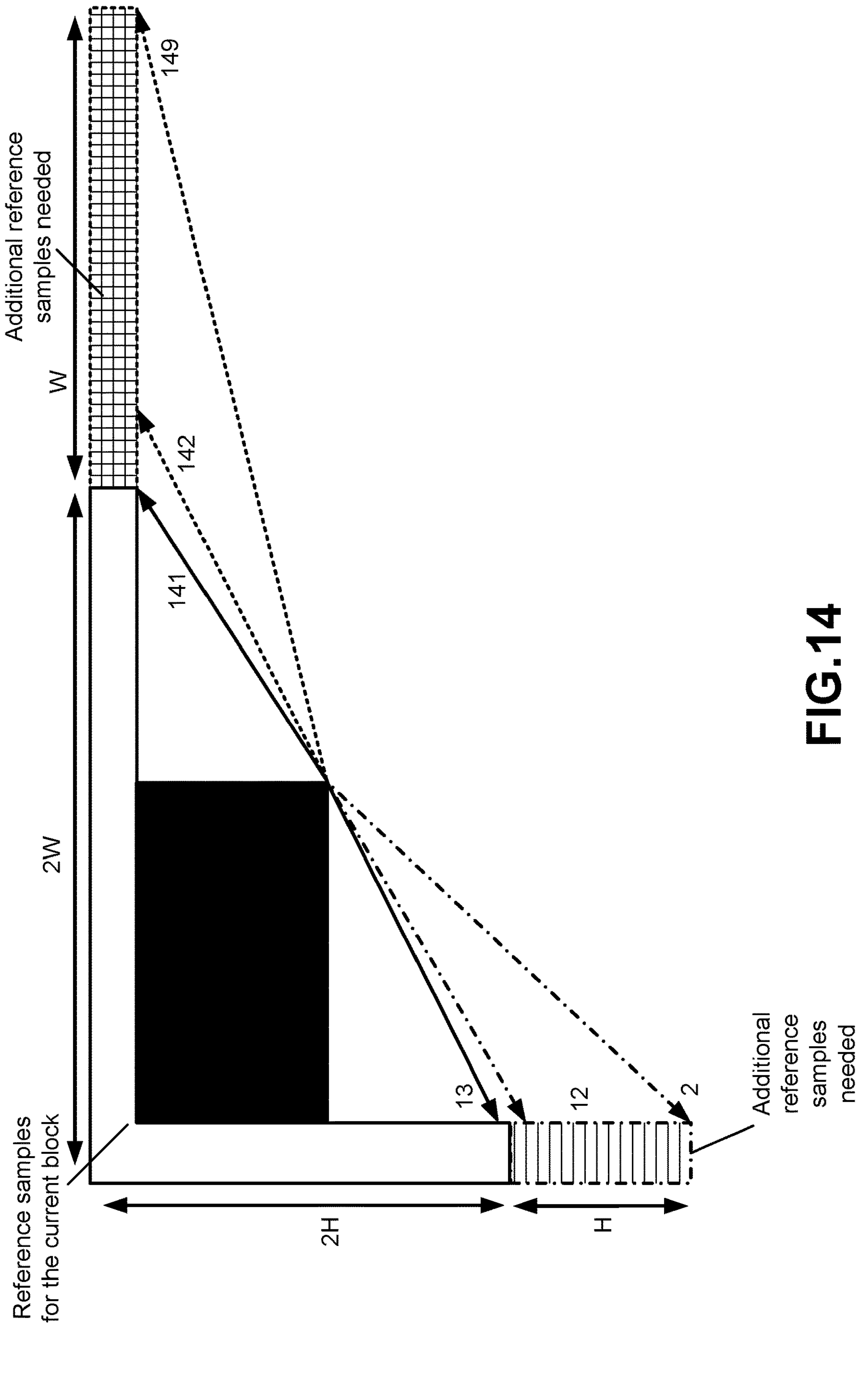
FIG. 14 illustrates an example of a range of directions added by WAIP and a range of directions replaced by WAIP when a reference sample for a current block is rectangular.

FIG. 14 illustrates an example of a range of directions added by WAIP and a range of directions replaced by WAIP when a reference sample for a current block is rectangular. The current block may be associated with a first shape, and a first intra prediction mode (e.g., the mode excluded from the test list or disallowed to be tested due to WAIP substitution) may be associated with a second shape. The second shape may be associated with the directions replaced by WAIP. For example, with a square block, before replacing modes, the modes may be square. With WAIP substitution, for example, the replaced modes may correspond with a shape (e.g., a shape that is rectangular). In FIG. 13, for example, mode 13 may be at 45 degrees and follow the characteristics of using a rectangular block. The first shape may be rectangular, and the second shape may be square. Adjacent sides of the first shape may differ in length from one another. In FIGS. 13 and 14, for example, WAIP may use wide angles that would be allowed for CUs (e.g., other CUs), without limiting the TIMD search. The WAIP modes reserved for neighboring block sizes (e.g., W/H=1 (2 to 12) and W/H=4 (142 to 149)) may be allowed in the TIMD search for the current block, and, for example, when W/H=0.5 and W/H=8, etc.

Figure 15:
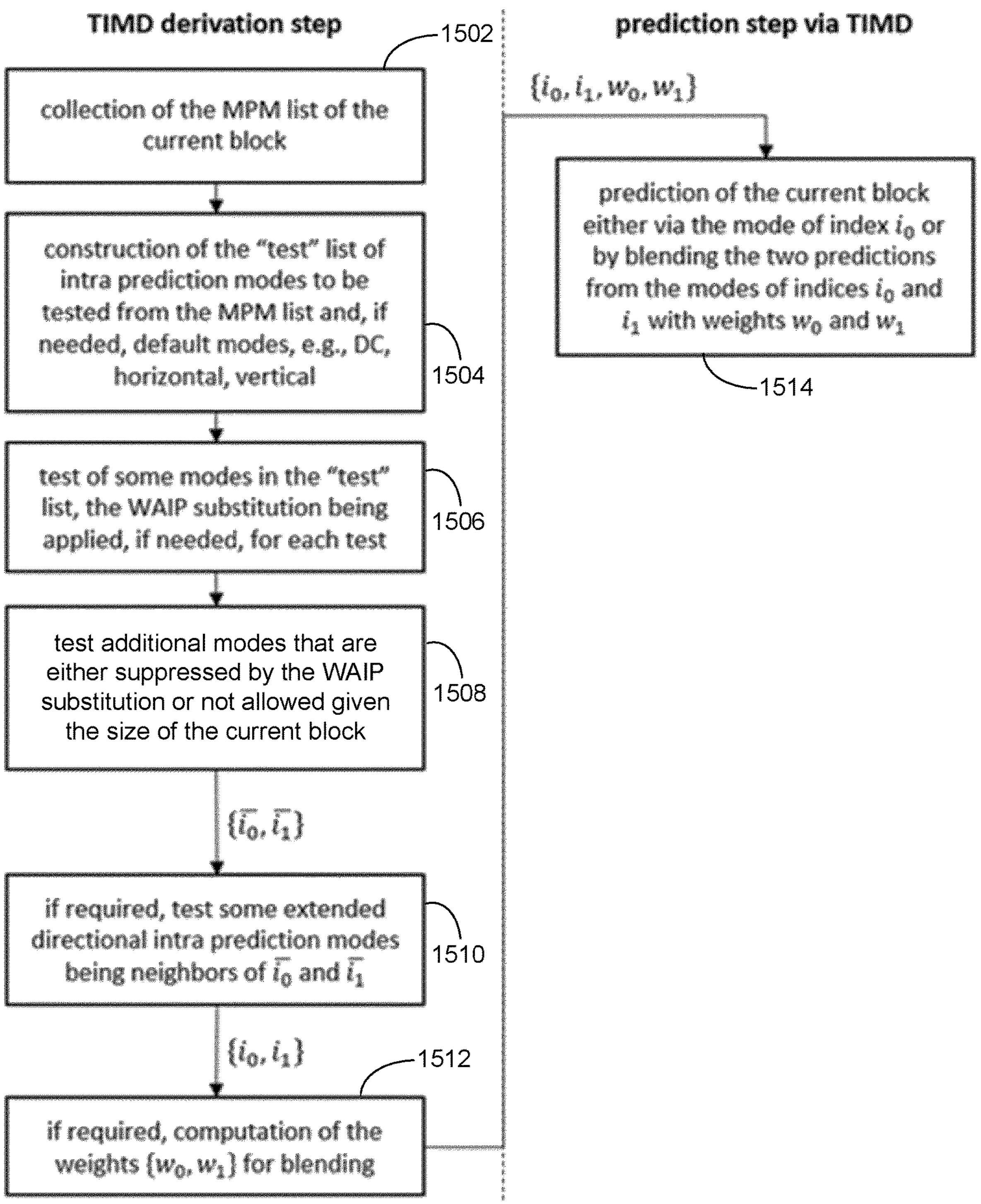
FIG. 15 illustrates an example of a template-based intra mode derivation (TIMD) derivation procedure for the current block to be predicted when one or more additional directional intra prediction modes are allowed.

Tests may be added for directional intra prediction modes allowed during the TIMD derivation. As described herein with various examples, intra prediction modes may be additionally allowed for TIMD. Tests for the additional intra prediction modes may be added to TIMD derivation. FIG. 15 illustrates an example workflow for TIMD derivation for a current block to be predicted. As shown in FIG. 15, the position or implementation order of an additional group of tests within the workflow of TIMD derivation may vary. For example, as shown by example in FIG. 16, an additional group of tests may occur after testing the extended directional intra prediction modes being neighbors of $\bar{i}_0$, $\bar{i}_1$. As shown by example in FIG. 17, an additional group of tests may occur before collecting the MPM list of the current block. The size of the current block to be predicted may be known. The intra prediction modes replaced by WAIP and/or the wide-angle modes not considered for the block size (e.g., the first intra prediction mode) may be known. The tested of the intra prediction modes replaced by WAIP and/or the wide-angle modes not considered for the block size tested of the intra prediction modes replaced by WAIP and/or the wide-angle modes not considered for the block size may occur before the determination of the test list.

FIG. 15 illustrates an example of a TIMD derivation for the current block to be predicted, for example if/when one or more additional directional intra prediction modes are allowed, e.g., as described herein. The example TIMD derivation procedure shown in FIG. 15 describes TIMD derivation in ECM and tests for additionally allowed directional intra prediction modes. As shown in FIG. 15, to, 11 may denote the indices of two intra prediction modes, e.g., yielding the two smallest prediction SATDs on the template of the current block, for example, following the first pass of tests. As shown in FIG. 15, $i_0$, $i_1$ may denote the indices of two modes yielding the two smallest prediction SATDs on the template of the current block, for example, following the second pass of tests.

As illustrated in FIG. 15, 1502 through 1512 may comprise steps associated with derivation step of the TIMD procedure and 1514 may be associated with the prediction step of the TIMD procedure. At 1502, an MPM list of the current block may be collected. At 1504, the test list of intra prediction modes may be constructed. The intra prediction modes may be tested from the MPM list. Default modes (e.g., DC, horizontal, and/or vertical) may be included. At 1506, modes (e.g., some modes) in the test list may be tested, and WAIP substitution may be applied for a test (e.g., each test). At 1508, additional modes that are suppressed by the WAIP substitution and/or not allowed (e.g., disallowed in the test list) due to the size of the current block may be tested. At 1510, extended (e.g., some extended) direction intra prediction modes that neighbor $i_0$ and $i_1$ may be tested. At 1512, weights $w_0$, $w_1$ associated with the intra prediction modes may be computed for blending. At 1514, as part of prediction, the current block may be predicted via a mode of index $i_0$ or by blending the two prediction from the modes of indices $i_0$, $i_1$ with the weights $w_0$, $w_1$.

Figure 16:
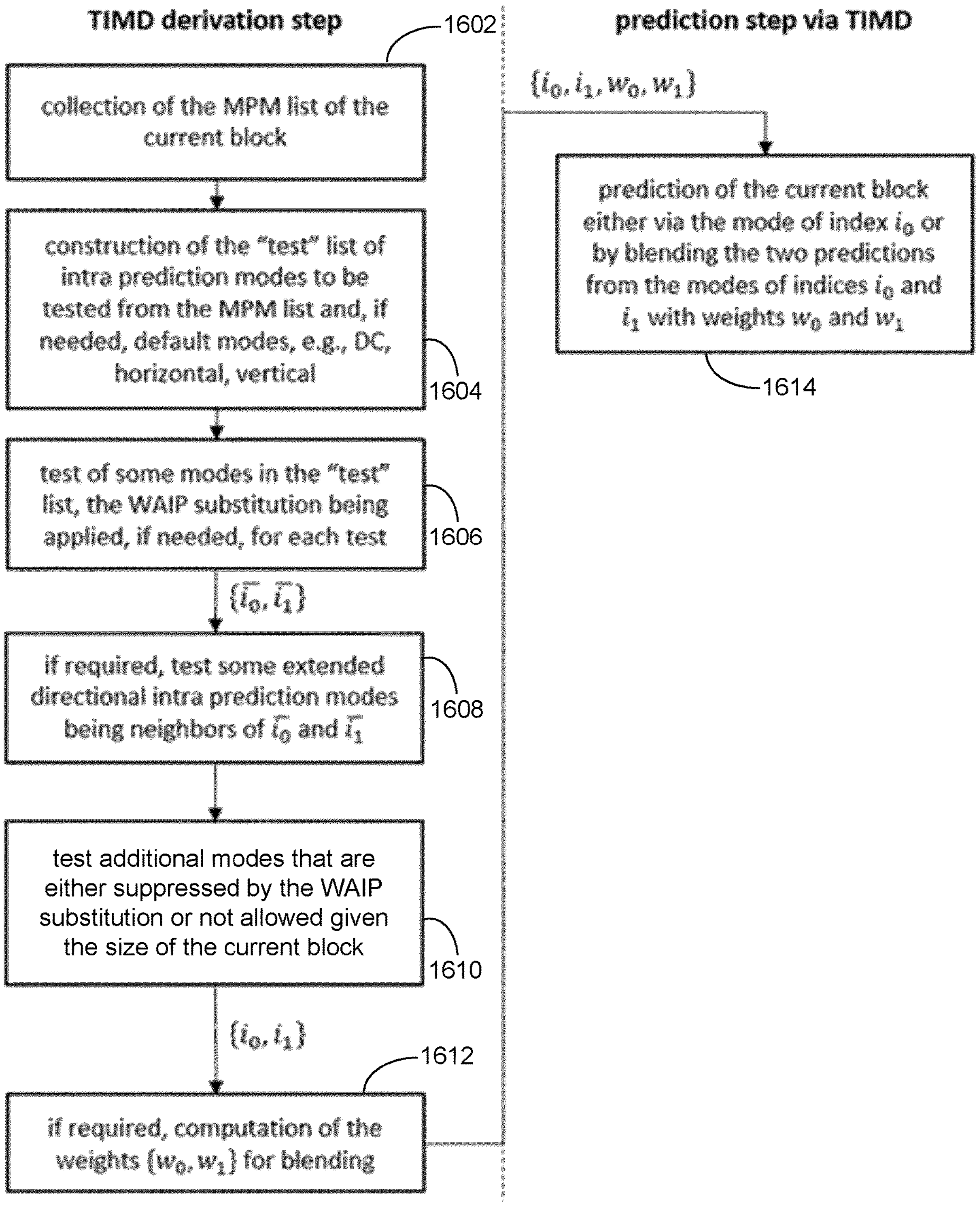
FIG. 16 illustrates an example of a TIMD derivation procedure for the current block to be predicted, e.g., when one or more additional directional intra prediction modes are allowed.

As illustrated in FIG. 16, 1602 through 1612 may comprise steps associated with derivation step of the TIMD procedure and 1614 may be associated with the prediction step of the TIMD procedure. FIG. 16 illustrates an example of a TIMD derivation procedure for the current block to be predicted, for example if/when one or more additional directional intra prediction modes are allowed, e.g., as described herein. At 1602, an MPM list of the current block may be collected. At 1604, the test list of intra prediction modes may be constructed. The intra prediction modes may be tested from the MPM list. Default modes (e.g., DC, horizontal, and/or vertical) may be included. At 1606, modes (e.g., some modes) in the test list may be tested, and WAIP substitution may be applied for a test (e.g., each test). At 1608, extended (e.g., some extended) direction intra prediction modes that neighbor $i_0$ and $i_1$ may be tested. At 1610, additional modes that are suppressed by the WAIP substitution and/or not allowed (e.g., disallowed in the test list) due to the size of the current block may be tested. At 1612, weights $w_0$, $w_1$ associated with the intra prediction modes may be computed for blending. At 1614, the current block may be predicted via a mode of index to or by blending the two prediction from the modes of indices to, 11 with the weights $w_0$, $w_1$.

Figure 17:
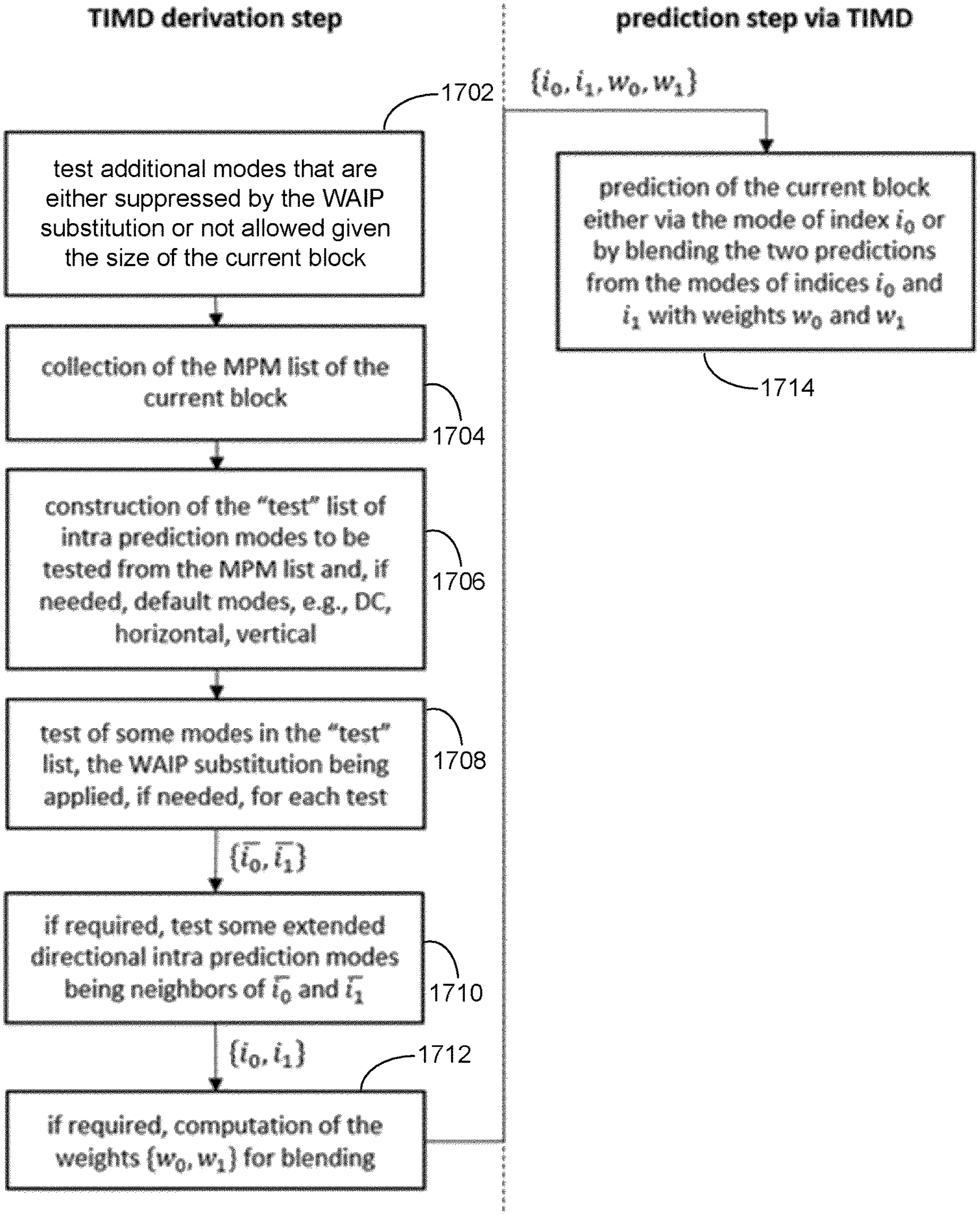
FIG. 17 illustrates an example of a TIMD derivation procedure for the current block to be predicted, e.g., when one or more additional directional intra prediction modes are allowed.

As illustrated in FIG. 17, 1702 through 1712 may comprise steps associated with derivation step of the TIMD procedure and 1714 may be associated with the prediction step of the TIMD procedure. FIG. 17 illustrates an example of a TIMD derivation procedure for the current block to be predicted, for example, if/when one or more additional directional intra prediction modes are allowed, e.g., as described herein. At 1702, additional modes that are suppressed by the WAIP substitution and/or not allowed (e.g., disallowed in the test list) due to the size of the current block may be tested. At 1704, an MPM list of the current block may be collected. At 1706, the test list of intra prediction modes may be constructed. The intra prediction modes may be tested from the MPM list. Default modes (e.g., DC, horizontal, and/or vertical) may be included. At 1708, modes (e.g., some modes) in the test list may be tested, and WAIP substitution may be applied for a test (e.g., each test). At 1710, extended (e.g., some extended) direction intra prediction modes that neighbor $i_0$ and $i_1$ may be tested. At 1712, weights $w_0$, $w_1$ associated with the intra prediction modes may be computed for blending. At 1714, the current block may be predicted via a mode of index to or by blending the two prediction from the modes of indices $i_0$, $i_1$ with the weights $w_0$, $w_1$.

In examples (e.g., involving additional tests), a given block may be predicted based on (e.g., all) additionally allowed intra prediction modes being (e.g., systematically) tested during a TIMD derivation procedure.

In examples (e.g., involving additional tests), additionally allowed intra prediction modes may be tested based on (e.g., under) certain circumstances. One or more additionally allowed intra prediction modes may be tested (e.g., during a TIMD derivation procedure), for example, if the non wide-angle intra prediction mode closest to the additionally allowed intra prediction mode(s) belongs to a test list (e.g., where the non wide-angle intra prediction mode has been tested or will be tested during the TIMD derivation procedure). For example, a TIMD derivation procedure may be implemented for a current 8×4 luminance CB. Directional intra prediction modes replaced by WAIP may be allowed. The additionally allowed intra prediction mode indices may belong to [|2, 12|], e.g., as shown in Table 2. The additionally allowed intra prediction modes (e.g., all the additionally allowed intra prediction modes) may be tested, for example, if the intra prediction mode of index 13 belongs to the test list. In an (e.g., another) example (e.g., during a TIMD derivation procedure), additionally allowed intra prediction modes may be tested, for example, if at least one of the $p \in \mathbb{N}^*$ non wide-angle intra prediction modes closest to the additionally allowed intra prediction mode(s) belongs to the test list (e.g., where the at least one of the $p \in \mathbb{N}^*$ non wide-angle intra prediction mode has been tested or will be tested during the TIMD derivation procedure). As an example, a TIMD derivation procedure may be implemented for a current 8×4 luminance CB and p=3. Directional intra prediction modes replaced by WAIP may be allowed. Additionally allowed intra prediction mode indices may belong to [|2, 12|], e.g., as shown in Table 2. The additionally allowed intra prediction modes (e.g., all the additionally allowed intra prediction modes) may be tested, for example, if the intra prediction mode of index 15 belongs to the test list.

In examples (e.g., involving additional tests), additionally allowed intra prediction modes may be tested if/when at least one of the directional intra prediction modes having an opposite direction with respect to an additionally allowed mode belongs to a test list.

In examples (e.g., involving additional tests), the decision of testing an additionally allowed intra prediction mode may depend on the SATD between the template of the current block and the prediction of the template via an already tested intra prediction mode. In examples, additionally allowed intra prediction modes may be tested if, for the non wide-angle intra prediction mode closest to the additionally allowed intra prediction mode(s), the SATD between the template of the current block and the mode prediction belongs to the set of the $n \in \mathbb{N}^*$ smallest prediction SATDs among the modes tested so far. In examples, (e.g., all) remaining allowed intra prediction modes may be tested if, for an additionally allowed intra prediction mode, the SATD between the template of the current block and the mode prediction belongs to the set of the $n \in \mathbb{N}^*$ smallest prediction SATDs among the modes tested so far. In examples, the SATD between the template of the current block and the prediction of the template via the mode may be used as criterion for ranking different intra prediction modes. In examples, a distortion metric between the template of the current block and the mode prediction of the template may be used (e.g., as criterion for ranking different intra prediction modes).

The intra prediction mode used by TIMD and WAIP may be stored. The intra prediction mode to be stored may be used, for example, to generate the MPM lists of luminance CBs surrounding the current luminance CB. The mode stored may be, for example, the closest mode or the mode with opposite direction.

The closest mode 130 may be stored, for example, if the mode selected by TIMD is in the range [|131, 141|] for a square luminance CB where modes for CUs of close shapes are allowed and where the angular modes of range [|2, 130|] (e.g., supplemented by the Planar and DC modes) would be used without the additional modes. In another example, mode 2 may be stored if the angular modes of range [|−9, 1|] are selected. In another example with a luminance CB of size 16×8 with allowed angular modes [|13, 141|], mode 13 may be stored if the selected mode is smaller than 13 whereas mode 141 may be stored if the selected mode is higher than 141.

In an example of storing a mode with opposite direction, the stored mode may be the original mode 130, 45° from the top right, if the mode selected by TIMD is the original mode 2, 45° from bottom left, and if mode 2 was removed in a horizontal block. In an example of a square luminance CB, the stored mode may be equal to 128 plus the value of the used mode when the used mode is under 34 (e.g., the fully horizontal mode). In an example of a square luminance CB, the stored mode may be equal to the used mode minus 128 when the used mode is above 98 (e.g., the fully vertical mode). In examples (e.g., even with WAIP), there may not be modes opposite to modes between 34 and 98 because such opposite modes would use reference samples on the right side or below the current luminance CB.

An extra flag may be stored, for example, to signal that the mode used by TIMD is not a mode that would have been used for (e.g., regular) intra prediction on the block shape to allow for the correct mode to be stored.

TIMD may be provided with additional decoded reference samples. During a TIMD derivation procedure, an intra prediction mode replaced by a WAIP process may be tested following the allowance of additional modes. The process of predicting the template of the current block from the decoded reference samples of the template may lack decoded reference samples. During a prediction step via TIMD, the process of predicting the current block from its decoded reference samples may lack decoded reference samples, for example, if the intra prediction mode that is replaced by WAIP but allowed following an allowance of additional modes is selected. Providing TIMD with additional decoded reference samples may compensate (e.g., make up) for a lack of decoded reference samples during TIMD derivation and/or during prediction via TIMD.

Decoded reference samples may be added for additionally allowed intra prediction modes. Decoded reference samples may be added for a given block to be predicted (e.g., during TIMD derivation and/or prediction via TIMD) for an additionally allowed intra prediction mode (e.g., allowed as described herein). At least one decoded reference sample may be added for a first intra prediction mode (e.g., an intra prediction mode that is excluded from the test list or disallowed to be tested due to wide-angle intra prediction (WAIP) substitution). The added decoded reference samples may correspond to the decoded reference samples that may be used for prediction.

Figure 18A:
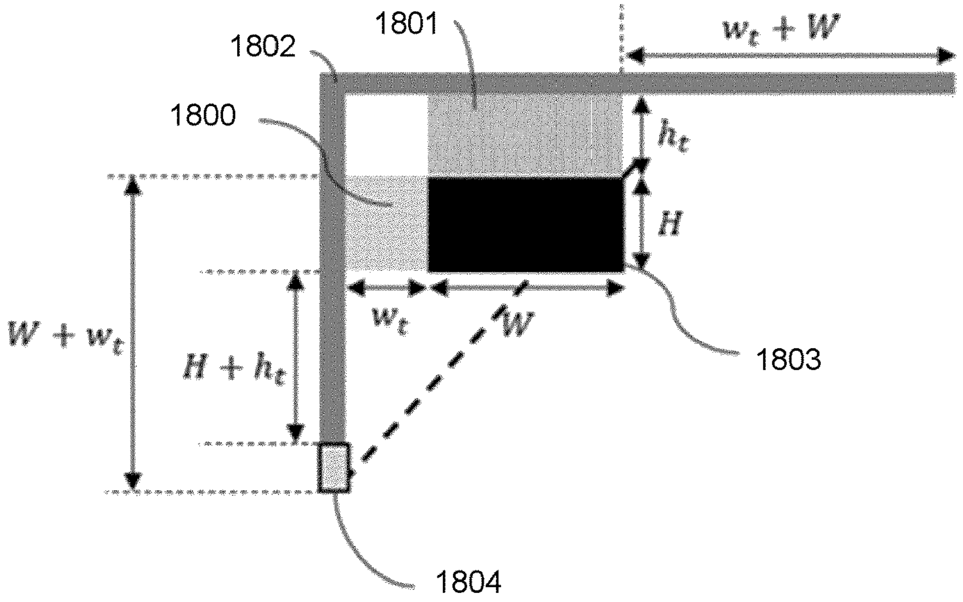
FIGS. 18A-18C illustrate an example of the addition of decoded reference samples, during TIMD derivation and prediction via TIMD, for a rectangular W×H block to be predicted, W>H, e.g., when one or more directional intra prediction modes replaced by WAIP are allowed.
Figure 18B:
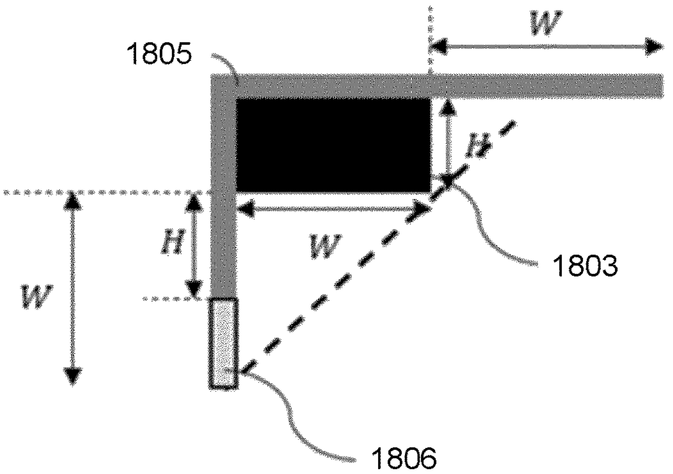
Figure 18C:
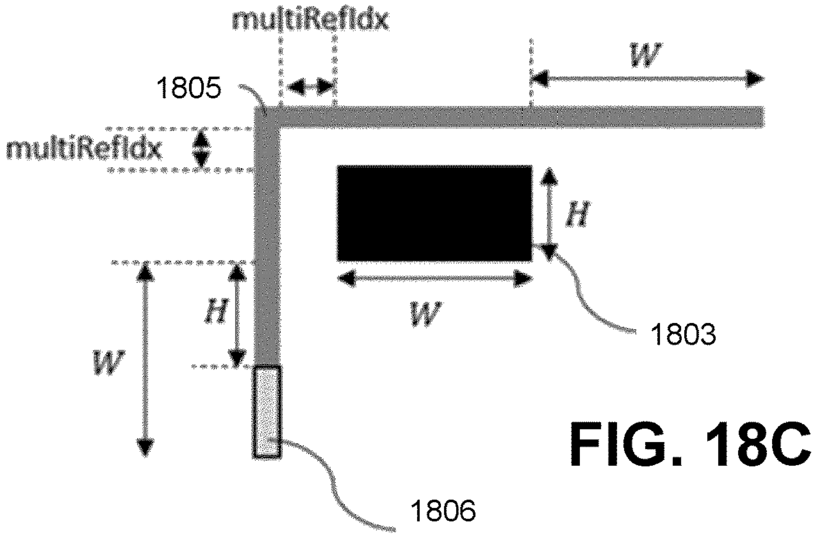
Figure 19A:
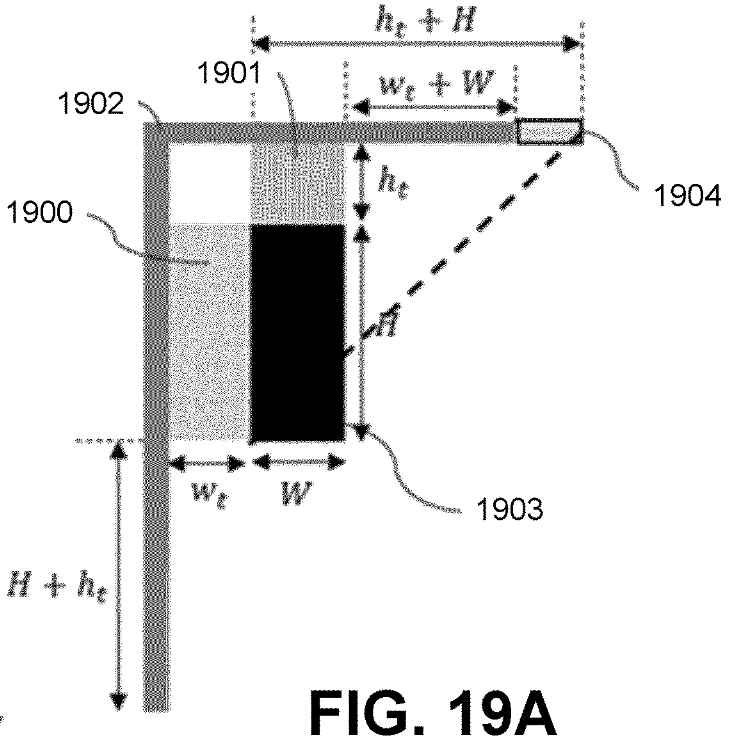
FIGS. 19A-19C illustrate an example of the addition of decoded reference samples, during TIMD derivation and prediction via TIMD, for a rectangular W×H block to be predicted, H>W, e.g., when one or more directional intra prediction modes replaced by WAIP are allowed.
Figure 19B:
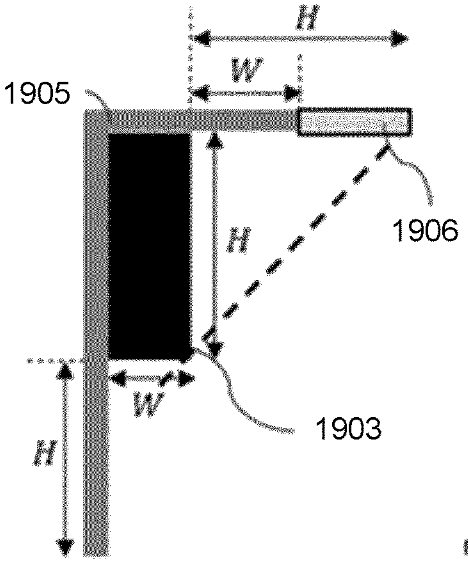
Figure 19C:
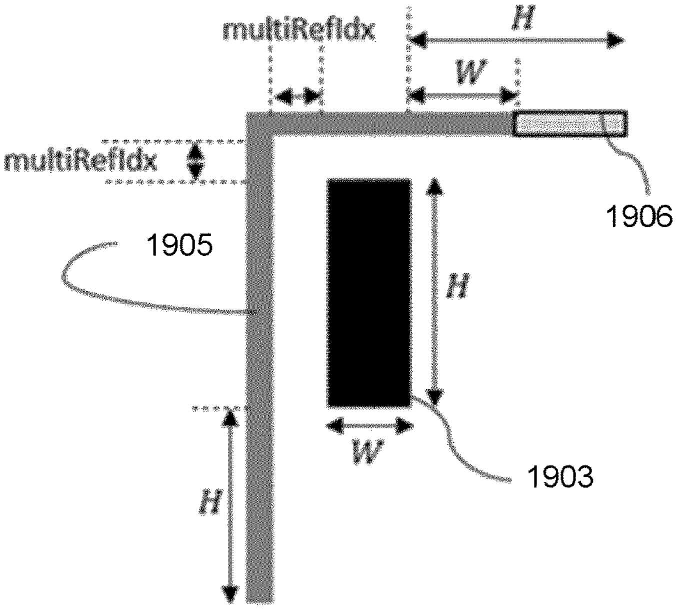

In an example for a rectangular W×H block, W>H, one or more intra prediction modes replaced by a WAIP process may be allowed. Prediction may occur via TIMD. W decoded reference samples below the current block may be considered for predicting via an additionally allowed intra prediction mode (e.g., similar to a square W×W block). FIGS. 18A-18C illustrate an example of adding decoded reference samples for TIMD derivation and prediction via TIMD. In an example for a W×H rectangular block, H>W, H decoded reference samples on the right side of the current block may be considered for predicting via an additionally allowed intra prediction mode (e.g., similar to a square H×H block). FIGS. 19A-19C illustrate an example of adding decoded reference samples for TIMD derivation and prediction via TIMD. As shown by examples in FIGS. 18A-18C and 19A-19C, the dashed line indicates an angle +45 degrees in clockwise direction. FIGS. 18A-18C show (e.g., for TIMD derivation and prediction via TIMD) the bottommost decoded reference sample extrapolated by the intra prediction mode of index 2, using the mode indexing in ECM (e.g., without considering interpolation of the decoded reference samples for a directional mode). FIGS. 19A-19C show (e.g., for TIMD derivation and prediction via TIMD) the rightmost decoded reference sample extrapolated by the intra prediction mode of index 130, using the mode indexing of TIMD in ECM (e.g., without considering interpolation of the decoded reference samples for a directional mode). The dashed line delineates the last decoded reference samples that may be used (e.g., exclusively) for prediction (e.g., without considering interpolation of the decoded reference samples for a directional mode and PDPC).

FIGS. 18A-18C illustrate an example of the addition of decoded reference samples, during TIMD derivation and prediction via TIMD, for a rectangular W×H block to be predicted, W>H, when one or more directional intra prediction modes replaced by WAIP are allowed. As shown in FIG. 18A, a current block (1803) may be surrounded by a TIMD template (1800 and 1801) during TIMD derivation. A tested intra prediction mode may predict the template of the current block from the decoded reference samples of the template (1802 and 1804). The added decoded reference samples (e.g., for one or more allowed additional directional intra prediction modes replaced by WAIP) are denoted 1804. As shown in FIGS. 18B and 18C, during prediction via TIMD, a (e.g., each) intra prediction mode derived via TIMD may predict the current block (1803) from associated decoded reference samples (1805 and 1806). The added decoded reference samples (e.g., for one or more allowed additional directional intra prediction modes replaced by WAIP) are denoted 1806. FIG. 18B illustrates an example of prediction via TIMD where the MRL index, denoted multiRefIdx, equals 0. FIG. 18C illustrates an example of prediction via TIMD where multiRefIdx>0.

FIGS. 19A-19C illustrate an example of the addition of decoded reference samples, during TIMD derivation and prediction via TIMD, for a rectangular W×H block to be predicted, H>W, when one or more directional intra prediction modes replaced by WAIP are allowed. As shown in FIG. 19A, the current block (1903) may be surrounded by a TIMD template (1900 and 1901) during TIMD derivation. A tested intra prediction mode may predict the template of the current block from the decoded reference samples of the template (1902 and 1904). The added decoded reference samples (e.g., for one or more allowed additional directional intra prediction modes replaced by WAIP) are denoted 1904. As shown in FIGS. 19B and 19C, during the prediction step via TIMD, a (e.g., each) mode derived via TIMD may predict the current block (1903) from associated decoded reference samples (1905 and 1906). The added decoded reference samples (e.g., for one or more allowed additional directional intra prediction modes replaced by WAIP) are denoted 1906. FIG. 19B illustrates an example of prediction via TIMD where the MRL index, denoted multiRefIdx, equals 0. FIG. 19C illustrates an example of prediction via TIMD where multiRefIdx>0.

In examples (e.g., during TIMD derivation for a rectangular W×H block, W>H), more decoded reference samples of the template of the current block, located at the bottommost of the current block, may be extracted for predicting via additionally allowed intra prediction modes. In examples (e.g., during TIMD derivation for a rectangular W×H block, H>W), more decoded reference samples of the template of the current block, located at the rightmost of the current block, may be extracted for predicting via additionally allowed intra prediction modes. FIGS. 20 and 21 show examples of extracting more decoded reference samples for prediction compared, respectively, to FIGS. 18 and 19.

Figure 20A:
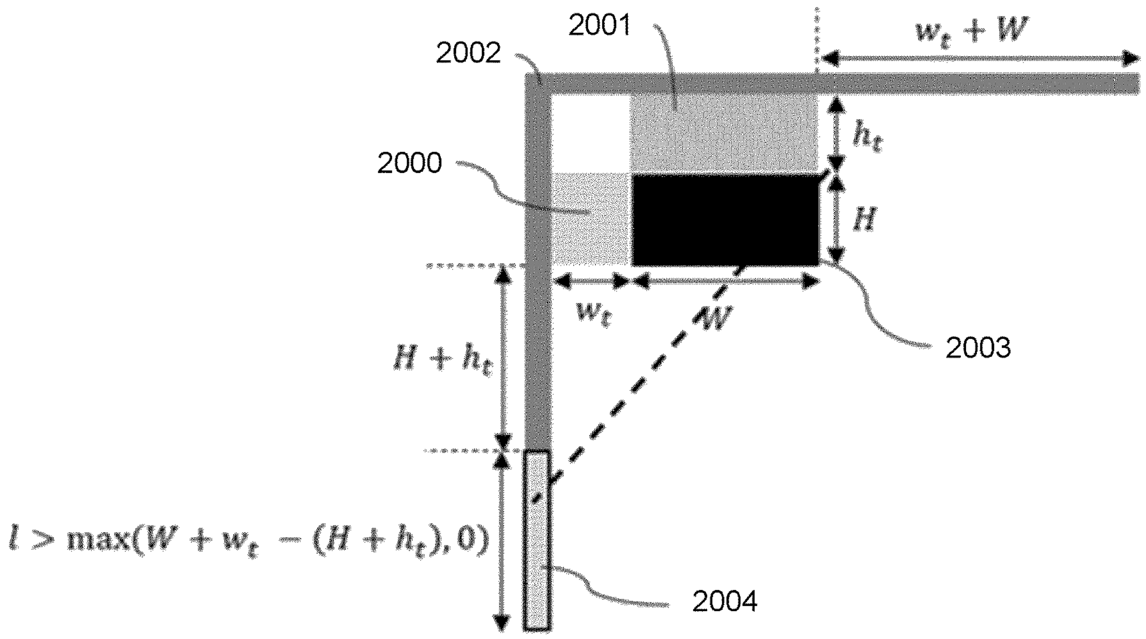
FIGS. 20A-20C illustrate an example of the addition of decoded reference samples during TIMD derivation and prediction via TIMD, for a rectangular W×H block to be predicted, W>H, e.g., when one or more directional intra prediction modes replaced by WAIP are allowed.
Figure 20B:
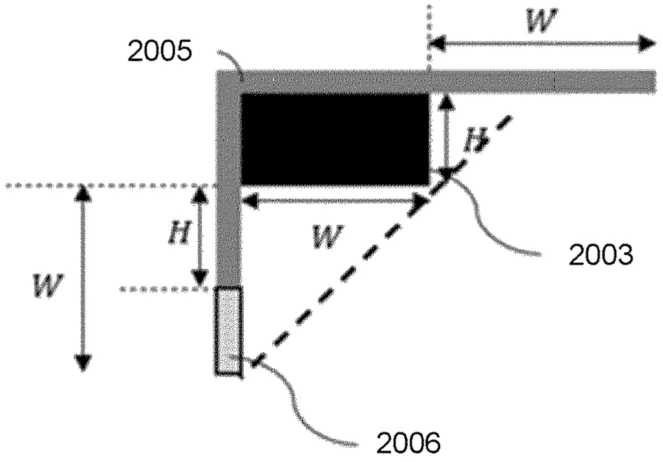
Figure 20C:
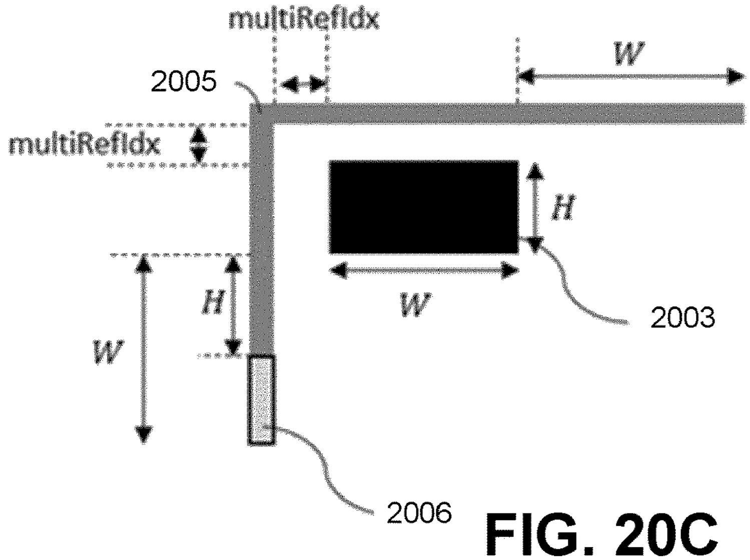

FIGS. 20A-20C illustrate an example of the addition of decoded reference samples during TIMD derivation (e.g., 20A) and prediction via TIMD (e.g., 20B and 20C), for a rectangular W×H block to be predicted, W>H, when one or more directional intra prediction modes replaced by WAIP are allowed. As shown in FIG. 20A, a current block (2003) (e.g., a horizontal and rectangular current block) may be surrounded by a TIMD template (2000 and 2001) during TIMD derivation. A tested intra prediction mode may predict the template of the current block from the decoded reference samples of the template (2002 and 2004). The added decoded reference samples (e.g., for one or more allowed additional directional intra prediction modes replaced by WAIP) are denoted 2004. As shown in FIGS. 20B and 20C, during prediction via TIMD, a (e.g., each) intra prediction mode derived via TIMD may predict the current block (2003) from associated decoded reference samples (2005 and 2006). The added decoded reference samples (e.g., for one or more allowed additional directional intra prediction modes replaced by WAIP) are denoted 2006.

Figure 21A:
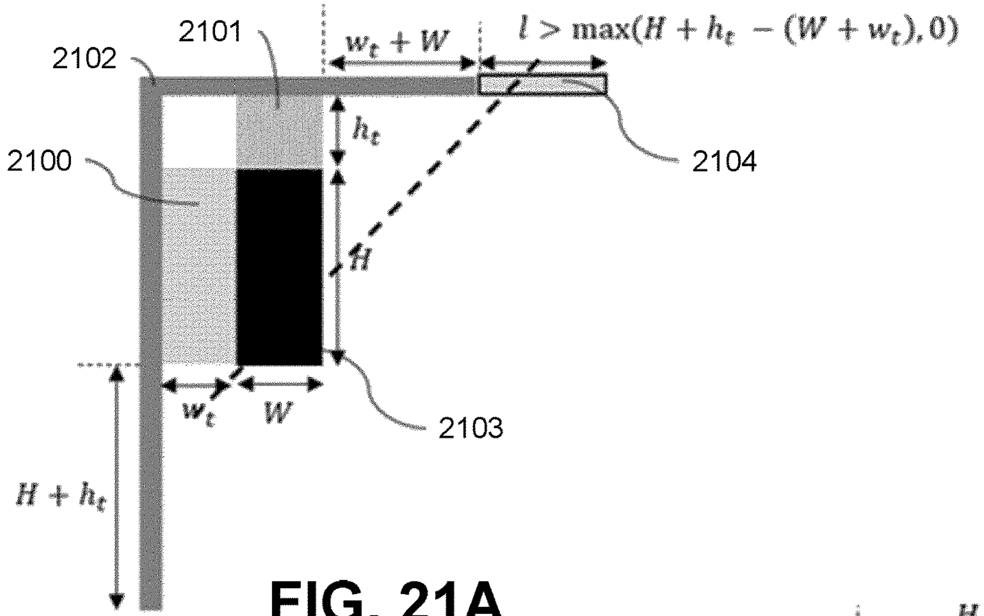
FIGS. 21A-21C illustrate an example of the addition of decoded reference samples during TIMD derivation and prediction via TIMD, for a rectangular W×H block to be predicted, H>W, e.g., when one or more directional intra prediction modes replaced by WAIP are allowed.
Figure 21B:
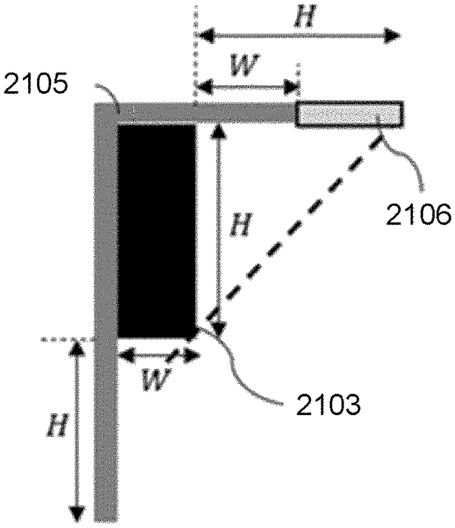
Figure 21C:
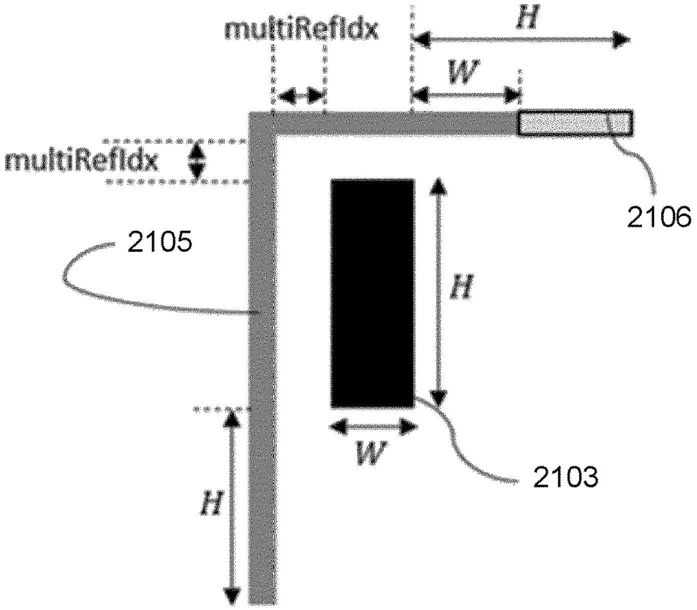

FIGS. 21A-21C illustrate an example of the addition of decoded reference samples during TIMD derivation (e.g., 21A) and prediction via TIMD (e.g., 21B and 21C), for a rectangular W×H block to be predicted, H>W, when one or more directional intra prediction modes replaced by WAIP are allowed. As shown in FIG. 21A, a current block (2103) (e.g., a vertical and rectangular current block) may be surrounded by a TIMD template (2100 and 2101) during TIMD derivation. A tested intra prediction mode may predict the template of the current block from the decoded reference samples of the template (2102 and 2104). The added decoded reference samples (e.g., for one or more allowed additional directional intra prediction modes replaced by WAIP) are denoted 2004. As shown in FIGS. 21B and 21C, during prediction via TIMD, a (e.g., each)

intra prediction mode derived via TIMD may predict the current block (2103) from associated decoded reference samples (2105 and 2006). The added decoded reference samples (e.g., for one or more allowed additional directional intra prediction modes replaced by WAIP) are denoted 2106.

In examples (e.g., as shown in FIGS. 18A-18C, 19A-19C, 20A-20C and 21A-21C), a current block may be predicted by substituting unavailable decoded reference samples in each set of decoded reference samples. Substitution may replace unavailable decoded reference samples, for example, in accordance with substitution implemented in VVC and ECM. Examples described herein (e.g., as shown in FIGS. 18A-18C, 19A-19C, 20A-20C and 21A-21C) may be adapted or generalized to prediction for the current block based on a portion of the template being available, for example, with the other portion of the template being out of the bounds of the current frame.

In examples (e.g., for a current block of a size using TIMD), additionally allowed intra prediction modes (e.g., the intra prediction modes that are replaced by WAIP) may be authorized for blocks of close shapes. Decoded reference samples used by the authorized intra prediction modes for blocks of close shapes may be extracted (e.g., if possible) for TIMD derivation and prediction using TIMD. In an example (e.g., with a current W×W block to be predicted), the CUs of close shapes may have width/height ratios of 1/2 and 2/1. Prediction via TIMD may consider 2 W decoded reference samples below the current block and 2 W decoded reference samples on the right side of the current block for predicting via an additionally allowed intra prediction mode (e.g., as shown by example in FIGS. 22A-22C). As shown in FIG. 22B, the dashed lines indicate two angles of two extreme wide angle intra prediction modes that are additionally allowed (e.g., allowing modes allowed for CUs of close shapes). An extreme wide angle intra prediction mode for a wide angle intra prediction mode propagating from top-right to bottom-left may refer to a mode with the smallest angle with the horizontal axis in absolute value. An extreme wide angle intra prediction mode for a wide angle intra prediction mode propagating from bottom-left to top-right may refer to the mode with the smallest angle with the vertical axis.

Figure 22A:
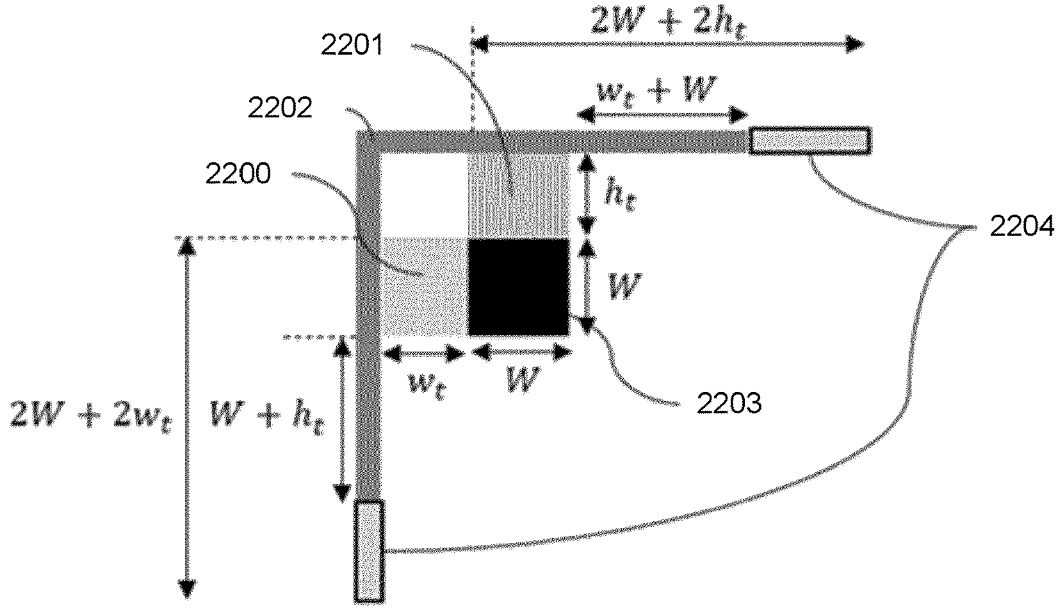
FIGS. 22A-22C illustrate an example of the addition of decoded reference samples during TIMD derivation and prediction via TIMD, for a square W×W block to be predicted.
Figure 22B:
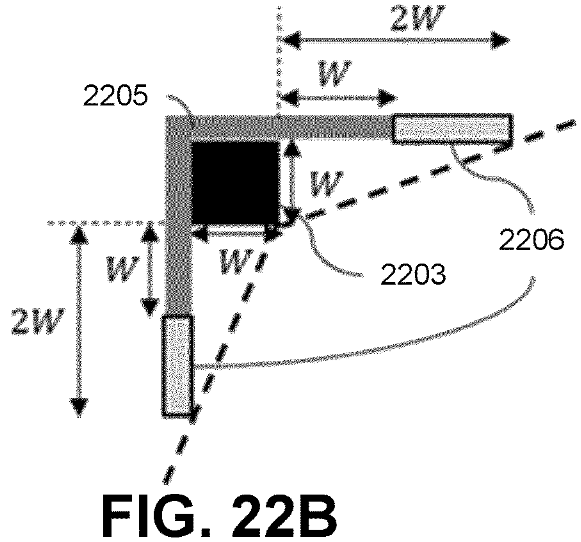
Figure 22C:
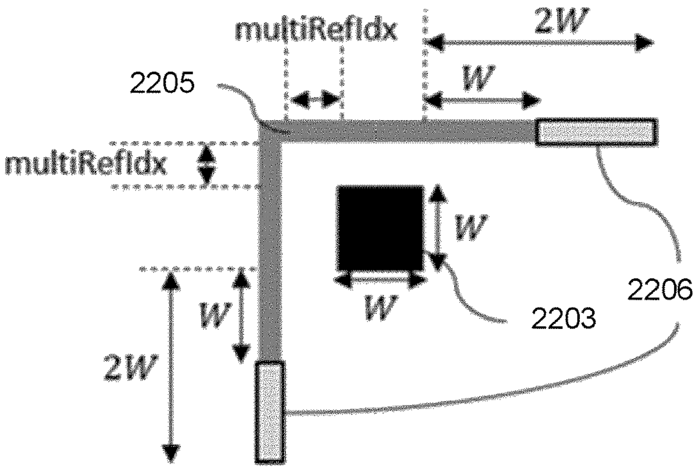

FIGS. 22A-22C illustrate an example of the addition of decoded reference samples during TIMD derivation (e.g., 22A) and prediction via TIMD (e.g., 22B and 22C), for a square W×W block to be predicted. A current block (2203) may be surrounded by an associated TIMD template (2200 and 2201) during TIMD derivation. A tested intra prediction mode may predict the template of the current block from the decoded reference samples of the template (2202 and 2204). The added decoded reference samples (e.g., according to one or more examples described herein) are denoted 2204. A (e.g., each) prediction mode derived via TIMD may predict the current block (2203) from associated decoded reference samples (2205 and 2206) during prediction via TIMD. The added decoded reference samples according to the first embodiment may be denoted 2206. FIG. 22B illustrates an example of prediction via TIMD where the MRL index, denoted multiRefIdx, equals 0. FIG. 22C illustrates an example of prediction via TIMD where multiRefIdx>0.

In examples, additional decoded reference samples of the template of the current block may be extracted (e.g., during TIMD derivation) for predicting via the additionally allowed intra prediction modes. The additional decoded reference samples may be located at the bottommost of the current block and at the rightmost of the current block. The example shown in FIGS. 23A-23C may be compared to the example shown in FIGS. 22A-22C for improved understanding of the examples.

Figure 23A:
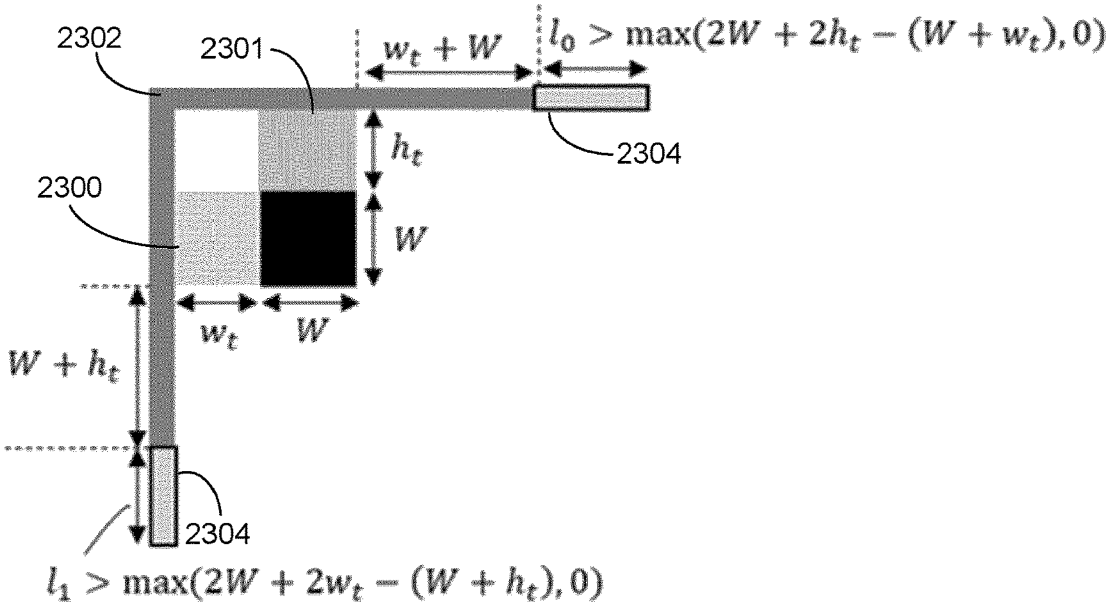
FIGS. 23A-23C illustrate an example of the addition of decoded reference samples during TIMD derivation and prediction via TIMD, for a rectangular W×W block to be predicted.
Figure 23B:
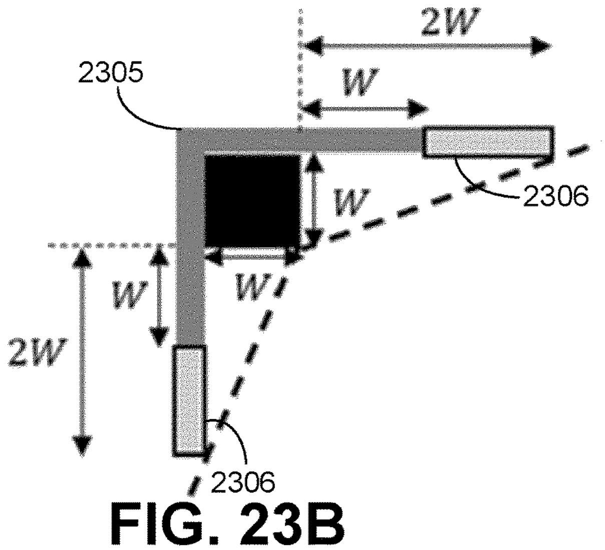
Figure 23C:
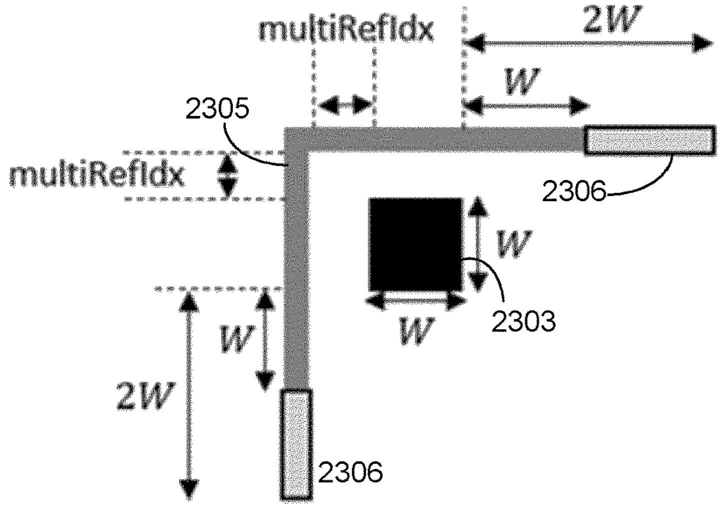

FIGS. 23A-23C illustrate an example of the addition of decoded reference samples during TIMD derivation (e.g., 23A) and prediction via TIMD (e.g., 23B and 23C), for a rectangular W×W block to be predicted. A current block (2303) may be surrounded by an associated TIMD template (2300 and 2301) during TIMD derivation. A tested intra prediction mode may predict the template of the current block from the decoded reference samples of the template (2302 and 2304). The added decoded reference samples (e.g., according to one or more examples described herein) are denoted 2304. A (e.g., each) prediction mode derived via TIMD may predict the current block (2303) from associated decoded reference samples (2305 and 2306) during prediction via TIMD. The added decoded reference samples according to the first embodiment may be denoted 2306.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A video decoding device comprising a processor, wherein the processor is further configured to:

obtain a most probable mode (MPM) list associated with a current block;

determine a test list of intra prediction modes from the MPM list;

test a first intra prediction mode, wherein the first intra prediction mode is excluded from the test list due to wide-angle intra prediction (WAIP) substitution or disallowed to be tested due to WAIP substitution;

generate a prediction for the current block based on the tested intra prediction mode; and decode the current block using the prediction.

2. The device of claim 1, wherein the first intra prediction mode being disallowed to be tested due to WAIP substitution comprises the first intra prediction mode being excluded from the test list.

3. The device of claim 1, wherein the processor is further configured to:

add the tested first intra prediction mode to the MPM list; and decode the current block based on the tested first intra prediction mode.

4. The video decoding device of claim 1, wherein the processor is further configured to:

test a second intra prediction mode, wherein the second intra prediction mode is included in the test list; and generate the prediction for the current block based on the tested first intra prediction mode and the tested second intra prediction mode.

5. The video decoding device of claim 1, wherein the current block is associated with a first shape, and wherein the first intra prediction mode is associated with a second shape, and wherein adjacent sides of the first shape differ in length from one another.

6. The video decoding device of claim 1, wherein the processor is further configured to:

generate a plurality of indices of intra prediction modes, and wherein the plurality of indices of intra prediction modes is used to generate the prediction for the current block.

7. The video decoding device of claim 1, wherein the processor is further configured to:

add decoded reference samples of the current block towards above-right side of the current block by at least one column or towards bottom-left side of the current block by at least one row.

8. The video decoding device of claim 1, wherein the processor is further configured to add at least one decoded reference sample for the first intra prediction mode.

9. A video decoding method, wherein the method comprises:

obtaining a most probable mode (MPM) list associated with a current block;

determining a test list of intra prediction modes from the MPM list;

testing a first intra prediction mode, wherein the first intra prediction mode is excluded from the test list due to wide-angle intra prediction (WAIP) substitution or disallowed to be tested due to WAIP substitution;

generating a prediction for the current block based on the tested intra prediction mode; and decoding the current block using the prediction.

10. The method of claim 9, wherein the first intra prediction mode being disallowed to be tested due to WAIP substitution comprises the first intra prediction mode being excluded from the test list.

11. The method of claim 9, wherein the method further comprises:

adding the tested first intra prediction mode to the MPM list; and decoding the current block based on the tested first intra prediction mode.

12. The method of claim 9, wherein the method further comprises:

testing a second intra prediction mode, wherein the second intra prediction mode is included in the test list; and generating the prediction for the current block based on the tested first intra prediction mode and the tested second intra prediction mode.

13. The method of claim 9, wherein the current block is associated with a first shape, and wherein the first intra prediction mode is associated with a second shape, and wherein adjacent sides of the first shape differ in length from one another.

14. The method of claim 9, wherein the method further comprises:

generating a plurality of indices of intra prediction modes, and wherein the plurality of indices of intra prediction modes is used to generate the prediction for the current block.

15. The method of claim 9, wherein the method further comprises:

adding decoded reference samples of the current block towards above-right side of the current block by at least one column or towards bottom-left side of the current block by at least one row.

16. The method of claim 9, wherein the method further comprises adding at least one decoded reference sample for the first intra prediction mode.

17. A video encoding method, wherein the method comprises:

obtaining a most probable mode (MPM) list associated with a current block;

determining a test list of intra prediction modes from the MPM list;

testing a first intra prediction mode, wherein the first intra prediction mode is excluded from the test list due to wide-angle intra prediction (WAIP) substitution or disallowed to be tested due to WAIP substitution;

generating a prediction for the current block based on the tested intra prediction mode; and encoding the current block using the prediction.

18. The method of claim 17, wherein the first intra prediction mode being disallowed to be tested due to WAIP substitution comprises the first intra prediction mode being excluded from the test list.

19. The method of claim 17, wherein the method further comprises:

adding the tested first intra prediction mode to the MPM list; and encoding the current block based on the tested first intra prediction mode.

20. The method of claim 17, wherein the method further comprises:

testing a second intra prediction mode, wherein the second intra prediction mode is included in the test list; and generating the prediction for the current block based on the tested first intra prediction mode and the tested second intra prediction mode.

* * * * *